(12) United States Patent
Wang et al.

(10) Patent No.: US 12,127,169 B2
(45) Date of Patent: Oct. 22, 2024

(54) UPLINK TRANSMISSION METHOD, USER EQUIPMENT, BASE STATION, AND COMPUTER READABLE MEDIUM

(71) Applicant: Samsung Electronics Co., Ltd., Suwon-si (KR)

(72) Inventors: Yi Wang, Beijing (CN); Chen Qian, Beijing (CN); Jingxing Fu, Beijing (CN); Feifei Sun, Beijing (CN)

(73) Assignee: Samsung Electronics Co., Ltd, Suwon-si (KR)

( * ) Notice: Subject to any disclaimer, the term of this patent is extended or adjusted under 35 U.S.C. 154(b) by 657 days.

(21) Appl. No.: 17/267,348

(22) PCT Filed: Aug. 8, 2019

(86) PCT No.: PCT/KR2019/009998
§ 371 (c)(1),
(2) Date: Feb. 9, 2021

(87) PCT Pub. No.: WO2020/032637
PCT Pub. Date: Feb. 13, 2020

(65) Prior Publication Data
US 2021/0282137 A1 Sep. 9, 2021

(30) Foreign Application Priority Data

Aug. 9, 2018 (CN) .......................... 201810905322.9
Jan. 9, 2019 (CN) .......................... 201910022152.4
(Continued)

(51) Int. Cl.
*H04W 4/00* (2018.01)
*H04W 72/0446* (2023.01)

(52) U.S. Cl.
CPC .............................. *H04W 72/0446* (2013.01)

(58) Field of Classification Search
CPC . H04W 72/0446; H04W 72/23; H04W 28/04; H04W 72/1268; H04W 72/20;
(Continued)

(56) References Cited

U.S. PATENT DOCUMENTS 11,470,587 B2 * 10/2022 Bae ...................... H04L 5/0082
11,877,281 B1 * 1/2024 Huang .................. H04L 1/1854
(Continued)

FOREIGN PATENT DOCUMENTS

CN 107810616 A 3/2018
CN 107852318 A 3/2018
(Continued)

OTHER PUBLICATIONS

NTT DOCOMO, INC., Offline Summary for AI 7.1.3.3.4 UL Data Transmission Procedure, XP 051398461, 3GPP TSG RAN WG1 Meeting #92 R1-1803295, Athens, Greece, Feb. 26-Mar. 2, 2018.
(Continued)

*Primary Examiner* — Phuongchau Ba Nguyen
(74) *Attorney, Agent, or Firm* — Jefferson IP Law, LLP

(57) ABSTRACT

The present disclosure provides an uplink transmission method, and a corresponding user equipment, base station and computer readable medium. A method for an uplink data transmission includes: determining a transmission occasion for an uplink transmission and a Hybrid Automatic Repeat Request, HARQ, process ID corresponding to the transmission occasion; determining an antenna port according to a correspondence between antenna ports and HARQ process IDs and/or a correspondence between antenna ports and transmission occasions; and transmitting, by the antenna port, uplink data corresponding to the HARQ process ID and a pilot signal corresponding to the uplink data. By establishing the correspondence between the antenna ports and the HARQ process IDs or the transmission occasion, the
(Continued)

base station determines the antenna port when detecting the uplink transmission, so that the HARQ process ID corresponding to the uplink transmission may be determined.

12 Claims, 18 Drawing Sheets

(30) Foreign Application Priority Data

| | | |
|---|---|---|
| Feb. 14, 2019 | (CN) | 201910116832.2 |
| Apr. 1, 2019 | (CN) | 201910260725.7 |
| Apr. 24, 2019 | (CN) | 201910337455.5 |

(58) Field of Classification Search
CPC ... H04W 72/04; H04W 72/042; H04W 88/08; H04W 28/08; H04W 28/084; H04W 36/22; H04W 72/12; H04L 1/08; H04L 5/0007; H04L 1/1822; H04L 1/1819; H04L 1/1896; H04L 5/0048; H04L 5/0055; H04L 1/1812; H04L 1/189; H04L 5/0023; H04L 5/0044; H04L 5/0012; H04L 5/0053; H04L 5/0098
See application file for complete search history.

(56) References Cited

U.S. PATENT DOCUMENTS

| | | | |
|---|---|---|---|
| 2005/0047393 A1 | 3/2005 | Liu | |
| 2017/0164213 A1 | 6/2017 | Lim et al. | |
| 2017/0230997 A1 | 8/2017 | Damnjanovic et al. | |
| 2018/0145802 A1 | 5/2018 | Hwang et al. | |
| 2018/0206224 A1 | 7/2018 | Hwang et al. | |
| 2018/0279097 A1* | 9/2018 | Shen | G06Q 10/0631 |
| 2018/0279297 A1* | 9/2018 | Nogami | H04L 1/1887 |
| 2019/0230689 A1* | 7/2019 | Cao | H04L 27/2602 |
| 2020/0052827 A1* | 2/2020 | Vilaipornsawai | H04W 72/23 |
| 2020/0367208 A1* | 11/2020 | Khoshnevisan | H04L 5/0048 |
| 2021/0007087 A1* | 1/2021 | Wei | H04W 72/21 |
| 2022/0046623 A1* | 2/2022 | Xiong | H04L 1/1819 |
| 2022/0200759 A1* | 6/2022 | Yoshioka | H04L 5/0007 |
| 2022/0224484 A1* | 7/2022 | Yi | H04L 5/0051 |
| 2023/0199759 A1* | 6/2023 | Choi | H04L 1/08 370/329 |
| 2023/0217447 A1* | 7/2023 | Guo | H04W 72/21 370/329 |
| 2023/0224874 A1* | 7/2023 | Lin | H04L 5/0094 370/336 |
| 2023/0232380 A1* | 7/2023 | Bhamri | H04L 1/08 370/329 |
| 2023/0239122 A1* | 7/2023 | Xiong | H04L 5/0094 370/280 |

FOREIGN PATENT DOCUMENTS

| | | | | |
|---|---|---|---|---|
| EP | 3 783 826 A1 | 2/2021 | | |
| EP | 3799505 A1 * | 3/2021 | | H04W 72/0446 |
| WO | 2014/071304 A1 | 5/2014 | | |
| WO | 2018/063591 A1 | 4/2018 | | |
| WO | 2019/217912 A1 | 11/2019 | | |

OTHER PUBLICATIONS

Intel Corporation, Remaining Issues of UL Transmission Procedures, XP051397941, 3GPP TSG RAN WG1 Meeting #92 R1-1802416, Athens, Greece, Feb. 26-Mar. 2, 2018.
Extended European Search Report dated Aug. 17, 2021, issued in European Patent Application No. 19847408.2.
3GPP; TSG RAN; Evolved Universal Terrestrial Radio Access, TS 36.213, V15.2.0, Jul. 19, 2018, Valbonne, France.
Chinese Office Action dated Sep. 5, 2022, issued in Chinese Patent Application No. 201910337455.5.
Indian Office Action dated Nov. 9, 2022, issued in Indian Patent Application No. 202117009761.
Extended European Search Report dated Jan. 19, 2024, issued in European Patent Application No. 23204408.1.

* cited by examiner

UPLINK TRANSMISSION METHOD, USER EQUIPMENT, BASE STATION, AND COMPUTER READABLE MEDIUM

CROSS-REFERENCE TO RELATED APPLICATION(S)

This application is a National Phase Entry of PCT International Application No. PCT/KR2019/009998, which was filed on Aug. 8, 2019, and claims priority to Chinese Patent Application No. 201810905322.9 which was filed on Aug. 9, 2018, in the Chinese Intellectual Property Office, Chinese Patent Application No. 201910022152.4 which was filed on Jan. 9, 2019, in the Chinese Intellectual Property Office, Chinese Patent Application No. 201910116832.2 which was filed on Feb. 14, 2019, in the Chinese Intellectual Property Office, Chinese Patent Application No. 201910260725.7 which was filed on Apr. 1, 2019, in the Chinese Intellectual Property Office, and Chinese Patent Application No. 201910337455.5 which was filed on Apr. 24, 2019, in the Chinese Intellectual Property Office, the contents of which are incorporated herein by reference.

TECHNICAL FIELD

The present application relates to the field of wireless communication technology, and in particular, to an uplink transmission method, a user equipment, a base station, and a computer readable medium.

BACKGROUND ART

Ultra-reliable low-latency communication (URLLC) proposed in 5G puts forward the demand for both delay and reliability. 3GPP Rel-15 may support end-to-end delays of less than 1 ms and block error rates of $10^{-5}$. With the growth of traffics such as Industrial Internet of Things, Augmented Reality (AR), Virtual Reality (VR), etc., more strict requirements have been put forward for URLLC. For example, 3GPP Rel-16 has studied the more demanding URLLC that requires support for an end-to-end latency of 0.5 ms to 1 ms and a block error rate of $10^{-6}$. This brings challenges for the New Radio (NR) communication system.

DISCLOSURE OF INVENTION

Technical Problem

Currently, the method of performing an uplink transmission based on an RRC configured grant (NR) of the NR system may allow a transmission started from a location where the redundancy version (RV) is 0. However, repeated transmitted physical uplink shared channel (PUSCH) cannot cross the boundary of the transmission period. That is because, in a case of multiple Hybrid Automatic Repeat Request (HARQ) process IDs being supported, the base station may incorrectly determine the HARQ process ID if the base station does not successfully detect the first transmission.

In addition, for uplink transmission scheduled by configured grant (i.e., semi-static or semi-persistent scheduled) in the NR, repetition of multiple mini-slots (or non-slots) in one slot is not yet supported. When there are data needed to be transmitted in uplink, they need to wait until the time available for transmission in each slot. Therefore, under this architecture, it is difficult to meet the requirements of low latency.

In addition, how to monitor ACKs for the configured uplink transmission when Bandwidth Part (BWP) switching is supported is also a problem to be solved.

Solution to Problem

According to a first aspect of the present disclosure, a method for uplink data transmission is provided. The method includes: determining a transmission occasion for an uplink transmission and a HARQ process ID corresponding to the transmission occasion; determining an antenna port according to a correspondence between antenna ports and HARQ process IDs and/or a correspondence between antenna ports and transmission occasions; and transmitting, by the antenna port, uplink data corresponding to the HARQ process ID and a pilot signal corresponding to the uplink data.

In an exemplary embodiment, the method for uplink data transmission further includes: determining the pilot signal corresponding to the uplink data according to at least one of: the HARQ process ID; the transmission occasion; or a configured parameter for generating the pilot signal.

In an exemplary embodiment, prior to transmitting, by the antenna port, uplink data corresponding to the HARQ process ID and a pilot signal corresponding to the uplink data, the method further includes: performing mapping of the uplink data according to antenna port information related to data mapping.

In an exemplary embodiment, the antenna port information includes at least one of: information of an antenna port on which no data mapping is performed; information of an antenna port corresponding to each HARQ process; information of an antenna port corresponding to each transmission occasion; or information of an antenna port corresponding to time-frequency resource information of each configured grant.

In an exemplary embodiment, the antenna port information is configured by an RRC message or by an activation DCI for a configured uplink transmission.

In an exemplary embodiment, the performing mapping of the uplink data according to the antenna port information related to data mapping includes at least one of: mapping, according to information indicating an antenna port for which no data mapping is performed that is configured by a base station, the uplink data on resource elements other than resource elements corresponding to the antenna port for which no data mapping is performed; mapping, according to all antenna ports in the correspondence between the antenna ports and the HARQ process IDs, the uplink data on resource elements other than resource elements corresponding to all the antenna ports on the symbol where the pilot signal is located; or mapping, according to an HARQ process ID corresponding to other transmission occasions occupied by the transmission of the uplink data started from the transmission occasion and at least one antenna port corresponding to the HARQ process ID, the uplink data on resource elements on a symbol where the pilot signal is located other than resource elements corresponding to the at least one antenna port and the antenna port for transmitting the uplink data and the pilot signal.

In an exemplary embodiment, the determining the transmission occasion for an uplink transmission further includes: determining the latest transmission occasion in an entire set of start positions of respective repetitions or a subset of start positions of the respective repetitions as the transmission occasion, according to time-frequency resource information and/or information of a number of repetitions in configuration information of uplink transmission configured by a base station; or determining the latest start position in start positions of each transmission period as the transmission occasion, according to transmission period information and/or the time domain offset information in configuration information of uplink transmission configured by a base station; or determining the latest sub-resource as the transmission occasion, according to initial resource information in configuration information of uplink transmission configured by a base station, where the sub-resource includes one or more symbols.

In an exemplary embodiment, the transmission period is configured to include one or more symbols, and a time length corresponding to the transmission period is less than a time length required for the number of repetitions configured for the uplink transmission.

According to a second aspect of the present disclosure, a transmission method is provided. The transmission method includes: receiving configuration information which comprises: information indicating that a repetition of time-frequency resource information is performed in a unit of a mini-slot, and/or information indicating that the repetition is or is not allowed to cross a slot boundary; and performing a transmission according to the configuration information.

In an exemplary embodiment, the performing the transmission according to the configuration information further includes determining a location of a pilot symbol according to one of: a number of symbols actually occupied by repetitions; or a number of symbols occupied by each scheduled repetition.

In an exemplary embodiment, the transmission includes an uplink transmission, and the transmission method further includes: perform mapping of the uplink transmission according to at least one of: mapping on an uplink symbol and a flexible symbol, wherein the uplink transmission is mapped to a next uplink symbol or flexible symbol if a downlink symbol is reached; mapping one repetition of the uplink transmission to consecutive uplink symbols only if a number of consecutive uplink symbols is greater than or equal to a number of symbols in the repetition; or mapping on an uplink symbol only, wherein the uplink transmission is mapped on a next uplink symbol if a downlink symbol or a flexible symbol is reached.

In an exemplary embodiment, the transmission includes a downlink transmission, and the transmission method further includes: mapping the downlink transmission according to at least one of: mapping on a downlink symbol and a flexible symbol, wherein the downlink transmission is mapped to a next downlink symbol or flexible symbol if an uplink symbol is reached; mapping one repetition of the downlink transmission to consecutive downlink symbols only if a number of consecutive downlink symbols is greater than or equal to a number of symbols in the repetition; or mapping on a downlink symbol only, wherein the downlink transmission is mapped on a next downlink symbol if an uplink symbol or a flexible symbol is reached.

In an exemplary embodiment, slot format(s) including the uplink symbol, the flexible symbol and the downlink symbol, are obtained by at least one of: semi-statistic slot formats configured by RRC; or a DCI for indicating slot formats.

In an exemplary embodiment, the slot formats obtained in different ways use different transmission mappings.

In an exemplary embodiment, the performing the transmission according to the configuration information further includes: determining a time domain resource location according to at least one of the following information in the configuration information: slot location information, location information of a start symbol in the slot, information of the number of occupied symbols, or information of the number of repetitions, wherein the number of occupied symbols is greater than the number of symbols in one slot.

In an exemplary embodiment, the number of repetitions is configured by the base station to be greater than or equal to 1, or preset to be 1 in a protocol.

In an exemplary embodiment, the performing the transmission according to the configuration information further includes: performing a next repetition from a next symbol available for transmission, after the current repetition is ended; or, performing a next repetition from a next symbol or a next available symbol, after the current repetition is ended; or, after the current repetition is ended, determining a location of a start symbol in a next available slot according to the location information of the start symbol in the slot in the configuration information, and starting a next repetition.

In an exemplary embodiment, the performing the transmission according to the configuration information further includes: determining a number of available resource elements according to at least one of: a configured number of all symbols occupied and/or number of symbols L in the time domain resource allocation; a number of symbols predefined or configured by a base station; a number of all symbols occupied and/or number of symbols L in the time domain resource allocation and an adjustment coefficient; a number $L_{min}$ of symbols corresponding to a transport block, which has a minimum number of symbols, of all transport blocks; a number $L_{max}$ of symbols corresponding to a transport block, which has a maximum number of symbols, of all transport blocks; or a number of symbols in a first transport block and a second transport block of all transport blocks.

In an exemplary embodiment, the performing the transmission according to the configuration information further includes: determining a Transport Block Size (TBS) by at least one of approaches, in which: if the number of all symbols occupied and/or number L of symbols in the time domain resource allocation is no greater than a specific value, the TBS is determined according to a first Modulation and Coding Scheme (MCS) table and the number of available resource elements, and if the number of all symbols occupied and/or number L of symbols in the time domain resource allocation is greater than the specific value, the TBS is determined according to a second MCS table and the number of available resource elements; if the number of all symbols occupied and/or number L of symbols in the time domain resource allocation is no greater than the specific value, the TBS is determined according to the first MCS table and the number of available resource elements, and if the number of all symbols occupied and/or number L of symbols in the time domain resource allocation is greater than the specific value, the TBS is determined according to a code rate R in the first MCS table and an adjustment coefficient, wherein the adjustment coefficient is configured by the base station or calculated according to a predefined rule.

In an exemplary embodiment, the transmission method further includes: performing frequency hopping on a transmission according to at least one of approaches, in which: the frequency hopping is performed in a unit of each repetition of the transmission; a predetermined number of repetitions are transmitted on a predetermined number of hops; and a predetermined number of symbols of each repetition are transmitted on a predetermined number of hops.

In an exemplary embodiment, transmitting the predetermined number of symbols of each repetition on the predetermined number of hops further includes: when the number of symbols actually transmitted in each repetition is greater than or no less than a predetermined number of symbols, performing intra-repetition frequency hopping, otherwise, performing inter-repetition frequency hopping.

According to a third aspect of the present disclosure, a timing method for an uplink transmission is provided. The timing method includes: pausing a timer that is running for the uplink transmission when a UE receives a BWP switching indication; and continuing the running of the timer when the UE switches to a new BWP.

In an exemplary embodiment, the continuing the running of the timer when the UE switches to the new BWP includes at least one of: continuing the running of the timer after a shortest time period required for the BWP switching; continuing the running of the timer when the UE starts data transmission or reception according to an uplink or downlink grant indicated by a base station; or continuing the running of the timer when a downlink search space is started to be monitored in the new BWP.

According to a fourth aspect of the present disclosure, a method of determining a HARQ process ID of uplink data is provided. The method includes: starting from each transmission occasion, detecting a pilot signal corresponding to uplink data on an antenna port corresponding to the transmission occasion; and determining the HARQ process ID of the uplink data according to a correspondence between an antenna port on which the pilot signal is detected and a HARQ process ID.

According to a fifth aspect of the present disclosure, a UE is provided. The UE includes: a processor; and a memory storing computer executable instructions that, when executed by the processor, cause the processor to perform the methods according to the first to the third aspects of the present disclosure.

According to a sixth aspect of the present disclosure, a base station is provided. The base station includes: a processor; and a memory storing computer executable instructions that, when executed by the processor, cause the processor to perform the method of the fourth aspect of the present disclosure.

According to a seventh aspect of the present disclosure, a computer readable medium is provided. The computer readable medium stores instructions that, when executed by a processor, cause the processor to perform the methods according to the first to the third aspects of the present disclosure.

According to an eighth aspect of the present disclosure, a computer readable medium is provided. The computer readable medium stores instructions that, when executed by a processor, cause the processor to perform the method according to the fourth aspect of the present disclosure.

Advantageous Effects of Invention

According to various embodiments, the base station may correctly determine the HARQ process ID.

According to various embodiments, repetition of multiple mini-slots (or non-slots) in one slot may be supported to meet the requirements of low latency.

According to various embodiments, ACKs for the configured uplink transmission may be monitored when BWP switching is supported.

MODE FOR THE INVENTION

Figure 1:
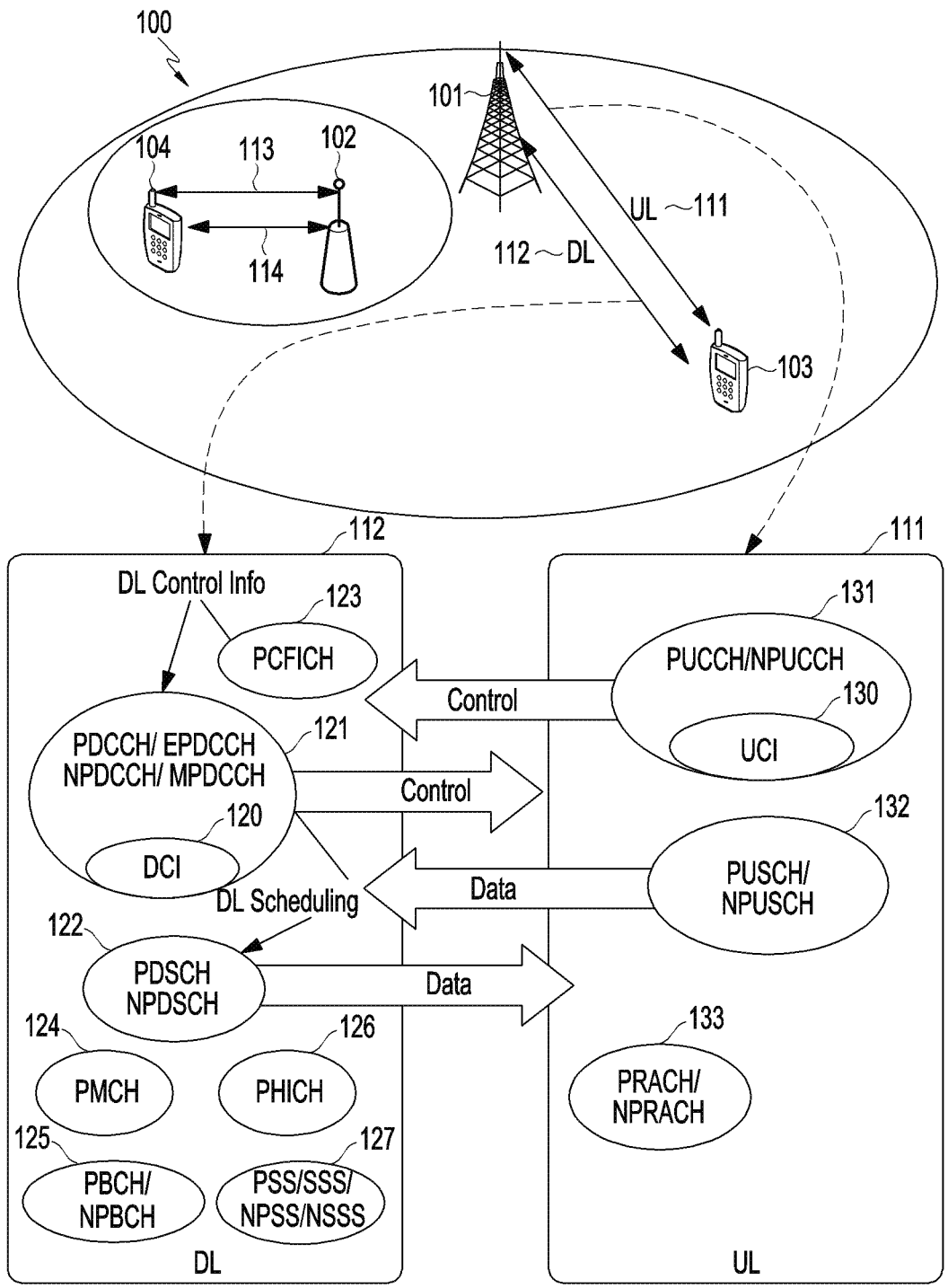
FIG. 1 illustratively shows an exemplary wireless communication system to which an exemplary embodiment of the present disclosure may be applied.

Embodiments of the present disclosure are described in detail below, examples of which are illustrated in the accompanying drawings, in which the same or similar reference numbers denote the same or similar elements or elements having the same or similar functions throughout. The embodiments described below with reference to the drawings are exemplary for explaining the present disclosure only, and should not be construed as limiting the present disclosure.

It will be understood by the skilled in the art that singular forms "a", "an", "said" and "the" used herein may also include plural forms, unless specifically stated. It should be further understood that the word "comprising" used in the description of the present disclosure refers to presence of features, integers, steps, operations, elements, and/or components, but does not exclude presence or addition of one or more other features, Integers, steps, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless defined otherwise, all terms (including technical and scientific terms) used herein have the same meaning as commonly understood by the skilled in the art to which the present disclosure belongs. It should also be understood that the terms such as those defined in a general dictionary should be understood as having a meaning that is consistent with that in the context of the prior art, and will not be explained with an idealized or too formal meaning, unless specifically defined herein.

The skilled in the art may understand that the "UE" and "terminal" used herein may include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "UE" and "terminal" used herein may also be a communication terminal, an Internet terminal, a music/video playing terminal, such as a PDA, a Mobile Internet Device (MID), and/or a mobile phone having a music/video playback function, or a smart TV, a set-top box and other devices. In addition, "UE" and "terminal" may also be replaced with "user" and "UE".

FIG. 1 shows an exemplary wireless communication system 100 in which an exemplary embodiment of the present disclosure may be applied. In FIG. 1, a UE detects indication information. The wireless communication system 100 includes one or more fixed infrastructure base units, forming a network which is distributed over a geographic area. The base unit may also be referred to as an Access Point (AP), an Access Terminal (AT), a Base Station (BS), a Node-B, and an evolved NodeB (eNB), a next generation BS (gNB), or other terms used in the art. As shown in FIG. 1, one or more base units 101 and 102 provide services for several Mobile Stations (MSs) or UEs or terminal devices or users 103 and 104 in a service area. For example, the service area may be a cell or a cell section. In some systems, one or more BSs may be communicatively coupled to a controller forming an access network, and the controller may be communicatively coupled to one or more core networks. Examples in the present disclosure are not limited to any of particular wireless communication systems.

In a time and/or frequency domain, the base units 101 and 102 transmit downlink communication signals 112 and 113 to the UEs 103 and 104, respectively. The UEs 103 and 104 communicate with one or more base units 101 and 102 via uplink communication signals 111 and 114, respectively. In one embodiment, the mobile communication system 100 is an Orthogonal Frequency Division Multiplexing (OFDM)/Orthogonal Frequency Division Multiple Access (OFDMA) system including a plurality of base stations and a plurality of UEs. The plurality of base stations include the base station 101, the base station 102, and the plurality of UEs include the UE 103 and the UE 104. The base station 101 communicates with the UE 103 through the uplink communication signal 111 and the downlink communication signal 112. When the base station has a downlink packet to be transmitted to UEs, each UE may obtain a downlink allocation (resource), such as a set of radio resources in a Physical Downlink Shared Channel (PDSCH) or a Narrowband Downlink Shared Channel (NPDSCH). When the UE needs to transmit a packet to the base station in the uplink, the UE obtains a grant from the base station, where the grant allocates Physical Uplink Shared Channel (PUSCH) or Narrowband Uplink Shared Channel (NPUSCH) containing a set of uplink radio resources. The UE obtains downlink or uplink scheduling information from a Physical Downlink Control Channel (PDCCH), or MTC Physical Downlink Control Channel (MPDCCH), or Enhanced Physical Downlink Control Channel (EPDCCH) or Narrowband Physical Downlink Control Channel (NPDCCH) dedicated to itself. Hereinafter, PDSCH, PDCCH, PUSCH are used to replace the above channels. The downlink or uplink scheduling information and other control information carried on the downlink control channel are referred to as Downlink Control Information (DCI). FIG. 1 also shows different physical channels, such as downlink 112 and uplink 111. The downlink 112 includes a PDCCH or EPDCCH or NPDCCH or MPDCCH 121, a PDSCH or NPDSCH 122, a Physical Control Formation Indicator Channel (PCFICH) 123, a Physical Multicast Channel (PMCH) 124, a Physical Broadcast Channel (PBCH) or a Narrowband Physical Broadcast Channel (NPBCH) 125, a Physical Hybrid Automatic Repeat Request Indicator Channel (PHICH) 126, and a Primary Synchronization Signal (PSS), a Secondary Synchronization Signal (SSS), or a Narrowband Primary Synchronization Signal/Secondary Synchronization Signal (NPSS/NSSS) 127. The downlink control channel 121 transmits a downlink control signal to the user. The DCI 120 is carried on the downlink control channel 121. The PDSCH 122 transmits data information to the UE. The PCFICH 123 transmits information for decoding PDCCH, e.g. dynamically indicating the number of symbols used by the PDCCH 121. The PMCH 124 carries broadcast multicast information. The PBCH or NPBCH 125 carries a Master Information Block (MIB) for UE early discovery and cell-wide coverage. The PHICH carries Hybrid Automatic Repeat reQuest (HARQ) information that indicates whether the base station has correctly received the uplink transmission signal. The uplink 111 includes a Physical Uplink Control Channel (PUCCH) 131 which carries Uplink Control Information (UCI) 130, a PUSCH 132 which carries uplink data information, and a Physical Random Access Channel (PRACH) 133 that carries random access information. In the NB-IoT system, no NPUCCH is defined, and NPUSCH Format 2 is used for transmitting the UCI 130.

In one embodiment, the wireless communication system 100 uses an OFDMA or multi-carrier architecture, including Adaptive Modulation and Coding (AMC) on downlink and a next-generation single-carrier FDMA architecture or multi-carrier OFDMA architecture for an uplink transmission. The FDMA-based single-carrier architecture includes Discrete Fourier Transform-Spread Orthogonal Frequency Division Multiplexing (DFT-SOFDM) of Interleaved Frequency Division Multiple Access (IFDMA), Localized FDMA (LFDMA), IFDMA, or LFDMA, and also includes various enhanced Non-Orthogonal Multiple Access (NOMA) architectures of an OFDMA system, e.g., Pattern Division Multiple Access (PDMA), Sparse Code Multiple Access (SCMA), Multi-User Shared Access (MUSA), Low Code Rate Spreading Frequency Domain Spreading (LCRS-FDS), Non-Orthogonal Coded Multiple Access (NCMA), Resource Spreading Multiple Access (RSMA), Interleave-Grid Multiple Access (IGMA), Low Density Spreading With Signature Vector Extension (LDS-SVE), Low code rate and Signature based Shared Access (LSSA), Non-Orthogonal Coded Access (NOCA), Interleave Division Multiple Access (IDMA), Repetition Division Multiple Access (RDMA), Group Orthogonal Coded Access (GOCA), Welch-bound equality based Spread MA (WSMA), etc.

In the OFDM system, a remote unit is served by allocating downlink or uplink radio resources that typically include a set of subcarriers on one or more OFDM symbols. Exemplary OFDMA protocols include LTE evolved from 3GPP UMTS standards and IEEE 802.16 standards. The architecture may also include the use of transmission technologies, such as Multi-Carrier CDMA (MC-CDMA), Multi-Carrier Direct Sequence CDMA (MC-DS-CDMA), and Orthogonal Frequency and Code Division Multiplexing (OFCDM) in one-dimensional or two-dimensional transmission, or may be based on a simpler time and/or frequency division multiplexing/multiple access technology, or a combination of these different technologies. In an alternative embodiment, the communication system may use other cellular communication system protocols, including but not limited to Time Division Multiplexing Access (TDMA) or direct sequence CDMA.

Determination of HARQ Process ID

In the uplink transmission according to uplink Semi-Persistence Scheduling (SPS) or pre-allocated uplink grant (UL grant) of the LTE, if the uplink HARQ operation is not autonomous, the HARQ process ID associated with the Transmission Time Interval (TTI) of the start position is derived by the following formula:

If the TTI is a subframe TTI:

HARQ Process ID=[floor(CURRENT_TTI/semiPersistSchedIntervalUL)]modulo numberOfConfUl-SPS-Processes, where CURRENT_TTI=[(SFN*10)+subframe number], which is a position of a first transmission of a bundle.

Otherwise (for short TTI (sTTI)):

HARQ Process ID=[floor(CURRENT_TTI/semiPersistSchedIntervalUL-sTTI)]modulo numberOfConfUlJSPS-Processes-sTTI, where CURRENT_TTI= [(SFN*10*sTTI_Number_Per_Subframe)+subframe number*sTTI_Number_Per_Subframe+sTTI_number], which is a position of an sTTI occasion where the first transmission of the bundle is located, wherein sTTI_Number_Per_Subframe is the number of sTTIs in each subframe, and sTTI_number is a serial number of the sTTI.

In addition, in LTE, an offset of a HARQ process ID may be configured by a higher layer for supporting a plurality of HARQ processes.

In NR, for the configured UL grant, also referred to as UL grant free, the HARQ ID associated with the first symbol of the uplink transmission is derived by the following formula:

HARQ Process ID=[floor(CURRENT_symbol/Period)] mod Number of HARQ Processes, where CURRENT_symbol=(System Frame Number (SFN)×numberOfSlotsPerFrame×numberOfSymbolsPerSlot+Slot Number in the Frame×numberOfSymbolsPerSlot×Symbol Number in the Slot.

That is, in both NR and LTE, the start position (TTI or symbol) of the uplink transmission is used to derive the HARQ process ID. However, in order to satisfy the requirements of the low latency and high reliability, it is necessary to support the autonomous uplink transmission at any time (such as each one or more symbols/TTIs/slots/subframes, etc.), thereby reducing the latency caused by waiting for the transmission occasion.

Figure 2:
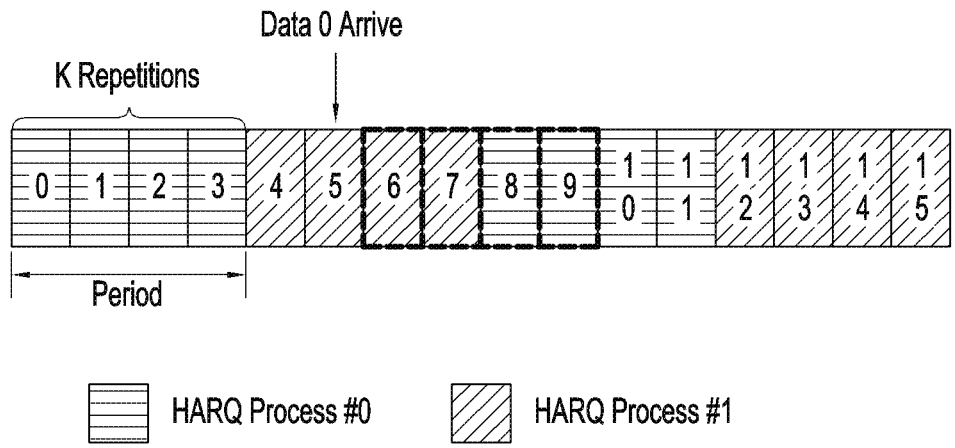
FIG. 2 illustratively shows a schematic diagram of resource mapping of an uplink data transmission according to an embodiment of the present disclosure.

FIG. 2 illustratively shows a schematic diagram of resource mapping of an uplink data transmission according to an embodiment of the present disclosure. As shown in FIG. 2, it is assumed that the base station configures the number K of repetitions as K=4 (the first transmission is counted as the first repetition); the configured transmission period includes four resources, each transmission (repetition) occupying one resource; thus, the transmission period is exactly equal to the time length occupied by K repetitions; and the number of HARQ processes is 2. The resources in FIG. 2 are resources in the time domain, or the frequency domain, or the time-frequency domain. For the resources in the time domain, one resource in FIG. 2 may be one of: one or more OFDM symbols, one or more TTIs, one or more slots, one or more subframes, or other time units. In particular, for the mini-slot scheduling, one resource is several symbols occupied by one transmission. The resources in FIG. 2 may be consecutive or non-consecutive. According to an embodiment of the present disclosure, in order to reduce the latency of the uplink data transmission, it is allowed that the first uplink transmission may be performed at each resource. In addition, in order to guarantee the reliability, the number K of repetitions configured by the base station needs to be completed per transmission.

As shown in FIG. 2, there may be a case where K times of transmissions occupy resources corresponding to a plurality of HARQ processes. As shown in FIG. 2, Data 0 arrive at the position of Resource 5 (here, it means that the data have been encoded and may be transmitted at the next resource position), and the earliest position where the uplink transmission may be performed is Resource 6. In order to ensure the transmission reliability, it is necessary to perform K repetitions, which occupy Resources 6~9.

According to a predefined rule, such as the derivation rule of the HARQ process ID in LTE or NR, Resources 0~3 are the first transmission period, Resources 4~7 are the second transmission period, Resources 8~11 are the third transmission period, Resource 12~15 are the fourth transmission period, and so on. The transmission whose transmission occasion where the start position is located is at Resource 0~3 or 8~11 is HARQ Process #0, and the transmission whose transmission occasion where the start position is located is at Resource 4~7 or 12~15 is HARQ Process #1. Therefore, the UE derives that the uplink transmission is HARQ Process #1. However, for the base station, since the base station needs to determine the uplink transmission by detecting the uplink transmission signal, there is a possibility that the base station does not detect the uplink transmission on Resource 6 and Resource 7. If the base station detects the uplink transmission on Resource 8, the base station may consider that the UE starts transmission from Resource 8, and thus determines that the uplink transmission is HARQ Process #0. In this case, the packets cannot be correctly decoded eventually, and may affect other subsequent transmissions.

According to an embodiment of the present disclosure, a port number of the antenna port for transmitting the uplink signal (including the pilot signal and data) is bound to a HARQ process ID, or to a transmission occasion where a start position of an uplink transmission is located. When the base station detects a pilot signal on the antenna port, the antenna port may be determined according to the transmission position of the pilot signal and/or according to the pilot signal, thereby determining the HARQ process ID of the uplink transmission.

Figure 3:
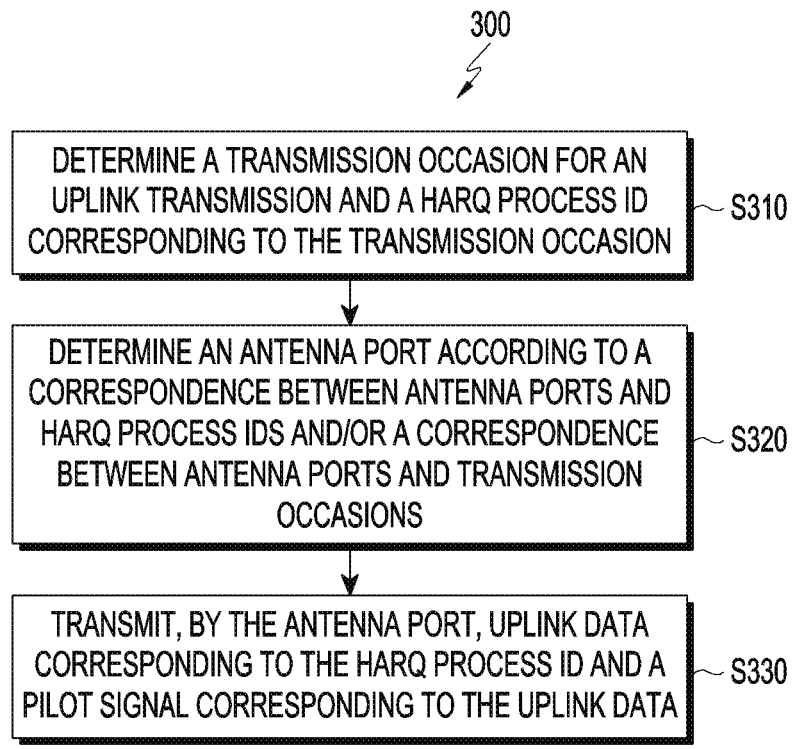
FIG. 3 illustratively shows a flowchart of a method for an uplink data transmission performed at a UE according to an exemplary embodiment of the present disclosure.

FIG. 3 illustratively shows a flowchart of a method for uplink data transmission performed at a UE according to an exemplary embodiment of the present disclosure.

As shown in FIG. 3, in step S310, a transmission occasion for an uplink transmission and a HARQ process ID corresponding to the transmission occasion are determined.

The UE receives, from the base station, configuration information for an uplink transmission without a dynamic grant, wherein the configuration information includes at least one of: a number of repetitions of the uplink transmission, a number of HARQ processes, a transmission period of a configured grant, antenna port information, time-frequency resource information of a configured grant, time-frequency resource start position information, or pilot signal information. The antenna port information includes at least one of: information of an antenna port on which no data mapping is performed; information of an antenna port corresponding to each HARQ process; information of an antenna port corresponding to each transmission occasion; or information of an antenna port corresponding to time-frequency resource information of each configured grant. According to an embodiment of the present disclosure, the pilot signal information may include at least one of: a demodulation reference signal (DMRS) used as a pilot signal; a pilot signal for other purposes (such as a phase-tracking reference signal (PT-RS), a sounding reference signal (SRS)); or DMRS for other co-scheduled users. The antenna port information is configured by an RRC message or an activation DCI for a configured uplink transmission. For example, the base station may transmit the configuration information of the uplink transmission without the dynamic grant by an RRC message, or an MAC signaling, or a physical layer signaling (such as DCI), or a joint RRC and physical layer signaling. The UE may determine possible transmission occasions available for the uplink transmission according to the configuration information for the uplink transmission. When the uplink data arrive, the latest one of these possible transmission occasions is determined as the transmission occasion for the uplink data transmission. Then, the HARQ process ID may be determined according to a correspondence between a predetermined transmission occasion (transmission period) and a HARQ process.

Then in step S320, an antenna port is determined according to a correspondence between antenna ports and HARQ process IDs and/or a correspondence between antenna ports and transmission occasions.

Finally, in step S330, uplink data corresponding to the HARQ process ID and a pilot signal corresponding to the uplink data are transmitted by the determined antenna port.

The UE may determine the pilot signal corresponding to the uplink data, according to at least one of: the determined HARQ process ID, the determined transmission occasion, or a configured parameter for generating the pilot signal. The above information for determining the pilot signal may be configured by the base station or obtained by a predefined rule. For example, the UE determines the pilot signal corresponding to the uplink data according to the parameter for generating the pilot signal, which is configured by the base station for each HARQ process ID. Alternatively, the pilot signal is generated according to the correspondence between the position of each transmission occasion and the pilot signal. Specifically, the position of each transmission occasion is used as the parameter for generating the pilot signal. In an embodiment in accordance with the present disclosure, the parameter for generating the pilot signal includes at least one of: an initial seed for generating an original pilot sequence, a parameter of cyclically shifting the original pilot sequence, or a parameter of applying a scramble code on the pilot sequence. In particular, different HARQ processes may use the same antenna port for the uplink transmission, and the pilot signals corresponding to the respective HARQ processes are different. The base station may determine the HARQ process ID by detecting different pilot signals.

In the embodiment of the present disclosure, the HARQ process ID is used to distinguish the HARQ process, but the present disclosure is not limited thereto. It is obvious to the skilled in the art that any information characterizing the HARQ process may be used.

Specifically, as shown in FIG. 2, Resources 0~3 and 8~11 correspond to HARQ Process #0, and Resources 4~7 and Resources 12~15 correspond to HARQ Process #1. Data 0 start at Resource 5. According to a predefined rule, the UE determines that the transmission started at Resource 5 belongs to HARQ Process #1. In an embodiment of the present disclosure, the correspondence between the antenna ports and the HARQ process IDs or the correspondence between the antenna ports and the transmission occasions is established. For example, it is predefined that the antenna port 0 and the antenna port 1 are corresponding to HARQ Process #0 and HARQ Process #1, respectively. According to the predefined correspondence rule, the UE derives that the transmission started at Resource 5 belongs to HARQ Process #1, and the antenna port 1 is used for HARQ Process #1, then the UE starts transmitting the uplink data corresponding to HARQ Process #1 from Resource 5, wherein Data 0 and the pilot signal corresponding to Data 0 are transmitted via the antenna port 1.

According to an embodiment of the present disclosure, the pilot signal may be a Demodulation Reference Signal (DMRS). Of course, the present disclosure is not limited thereto. According to an embodiment of the present disclosure, in order to improve the detection performance, FDM or TDM may be used in advance to make the antenna ports orthogonal, and the orthogonal antenna ports are then used for transmission of the pilot signals and the data. For one-layer uplink transmission, the UE may only transmit data on one antenna port. However, the base station may configure different antenna ports for different UEs for transmission, thereby achieving the effect of uplink multiple input multiple output MIMO.

Figure 4:
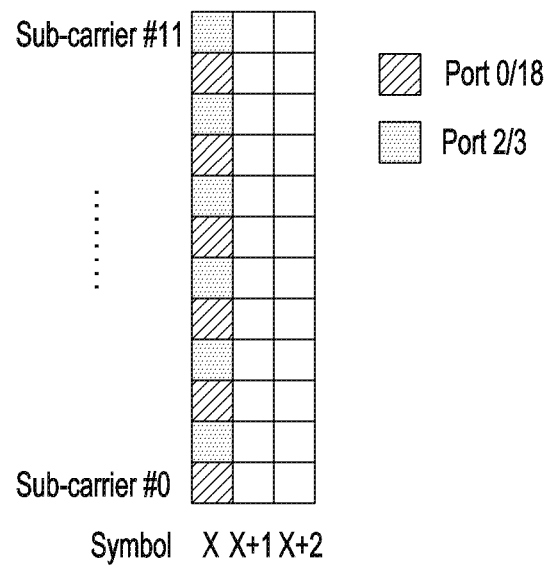
FIG. 4 illustratively shows a schematic diagram of a relationship between an antenna port and a subcarrier according to an embodiment of the present disclosure.

In a communication system, a resource grid corresponding to a subcarrier on a symbol is defined as a resource element (RE). The resource element is a minimum unit for carrying an uplink signal or a reference signal. The time domain resources are time domain positions of a set of occupied resource elements for carrying a channel or a signal, the frequency domain resources are frequency domain positions of a set of occupied resource elements for carrying a channel or a signal, and the time-frequency domain resources are time domain and frequency domain positions of a set of occupied resource elements for carrying a channel or a signal. The base station allocates to the UE a user grant for uplink transmission and/or downlink reception, indicating a set of resource elements occupied by the corresponding uplink or downlink transmission, which is referred to as resources occupied by one repetition hereinafter. As shown in FIG. 4, FDM is used to make the antenna ports orthogonal, wherein the reference signals respectively transmitted on the antenna port 0 and the antenna port 1 occupy Subcarriers 0, 2, 4, 6, 8, 10 of the 12 subcarriers on one or more symbols in a Physical Resource Block (PRB), and the reference signals respectively transmitted on the antenna ports 2 and 3 occupy the remaining subcarriers. The base station may configure the antenna port 0 and the antenna port 2 respectively for the uplink transmission of two HARQ processes. Since the positions of the pilot signals transmitted on the antenna port are frequency divisional, the pilot signals transmitted on the antenna port are orthogonal. Similarly, the pilot signals transmitted on different antenna ports may be time divisional or code divisional and thus orthogonal.

According to an embodiment of the present disclosure, in order to guarantee the performance of the pilot signal (e.g., DMRS) detection, the UE may be configured not to perform data transmission on resource elements corresponding to other antenna ports on the symbol where the pilot signal is located. Specifically, as shown in FIG. 4, if the UE derives that the uplink transmission needs to be performed using the antenna port 0 or 1, the UE does not map on the resource elements occupied by the antenna port 2/3 on the symbol where the pilot signal is located. Specifically, in an embodiment where the uplink grant indicates that Symbols X, (X+1), and (X+2) are time domain resources allocated to the UE, if the pilot signal is transmitted on Symbol X via the antenna port 0 or 1, the UE only maps the data portion on Symbols (X+1) and (X+2). The UE excludes the resource elements occupied by the antenna port 2/3 when calculating rate matching. Alternatively, the UE punctures the resource elements occupied by the antenna port 2/3 when performing the data mapping. According to an embodiment of the present disclosure, the UE may determine whether the rate matching or the puncturing is required for other antenna ports (such as the antenna port 2/3) by acquiring the configuration from the base station. If there is no transmission of data or pilot signals on some of the resource elements of the symbol where the pilot signal is located in order to improve the detection performance, power boosting may be performed on other resource elements of the symbol. The coefficient of the power boosting may be configured by the base station, or predefined, or calculated according to a predefined rule (e.g., assuming that the transmit power on each symbol is the same, the transmit power on each resource element may be derived). In particular, the power boosting may be performed on the pilot signal (e.g., DMRS) and/or data.

Figure 5:
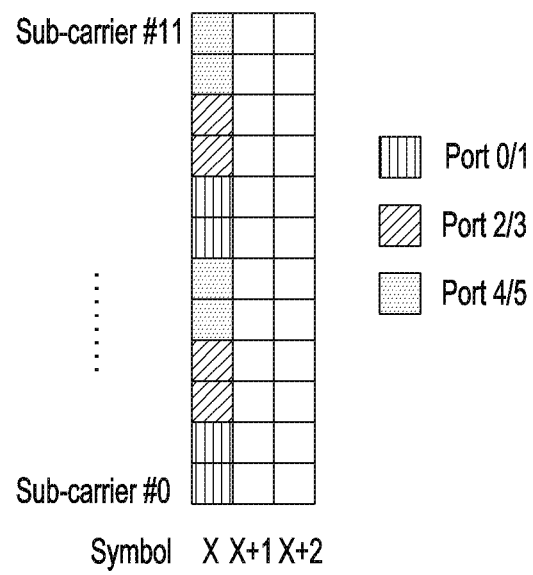
FIG. 5 illustratively shows a schematic diagram of a relationship between an antenna port and a subcarrier according to an embodiment of the present disclosure.

In the NR system, the protocol specifies that for the uplink data transmitted in a waveform of DFT-S-OFDM, the antenna port 0 is used for the transmission, and the data are not mapped on other resource elements of the symbol where the pilot signal is located. For the uplink data transmitted in the waveform of DFT-S-OFDM, the base station may configure different antenna ports for different HARQ processes. Specifically, as shown in FIG. 4, the antenna port 0 and the antenna port 1 are respectively used to transmit HARQ Process #0 and HARQ Process #1. When the UE transmits the uplink data corresponding to HARQ Process #0, the DMRS corresponding to HARQ Process #0 is transmitted on the antenna port 0, and mapping and transmission of the data or pilot signals are not performed on other resource elements of the symbol where the DMRS is located. Similarly, when the UE transmits the data corresponding to HARQ Process #1, the DMRS corresponding to HARQ Process #1 is transmitted on the antenna port 1. This mapping may be configured by the base station, or specified according to the predefined rule. The above method is also applicable to the method of determining the transmission antenna port based on the transmission occasion. As another example, three FDM antenna ports may be supported by a frequency domain pilot density of 1/3, thereby supporting more HARQ processes. If more antenna ports are intended to be supported, the antenna ports may be expanded by CDM and/or TDM. According to an embodiment of the present disclosure, in order not to waste resources, the base station configures for the UE an antenna port on which no data mapping is performed. The antenna port configured by the base station on which no data mapping is performed may be explicitly or implicitly configured. For example, a port number of the antenna port on which no data mapping is performed may be directly configured. The UE performs uplink data mapping on the resource elements other than the resource elements corresponding to the antenna port on which no data mapping is performed, according to the information indicating the antenna port on which no data mapping is performed, as explicitly/implicitly configured by the base station. Alternatively, according to an embodiment of the present disclosure, the correspondence between the HARQ process IDs and the antenna ports may be predefined. Thus, the UE does not perform uplink data mapping on the resource elements which are corresponding to all the antenna ports included in the correspondence, on the symbol where the pilot signal is located. That is, the UE performs the uplink data mapping on the resource elements other than the resource elements which are corresponding to all the antenna ports, on the symbol where the pilot signal is located. Specifically, for example, as shown in FIG. 5, for a Type 2 DMRS in NR, one antenna port occupies 4 REs in one symbol X, for example, the antenna port 0/1 occupying Subcarriers 0, 1, 6, and 7; the antenna port 2/3 occupying Subcarriers 2, 3, 8, 9; the antenna port 4/5 occupying Subcarriers 5, 6, 10, 11. If two HARQ processes are supported, the base station may configure one antenna port, such as the antenna port 0, for HARQ Process #0, and configure the other orthogonal (e.g., through FDM) antenna port, such as the antenna port 2, for HARQ Process #1. In order to guarantee the detection performance of the DMRS, the uplink data mapping is performed according to a predefined rule. The predefined rule may include, for example, no uplink data mapping being performed on resource elements which are corresponding to the antenna ports (or further, the antenna ports of FDM) corresponding to other HARQ processes, on the symbol where the pilot signal is located in the same uplink configuration information. Specifically, when the uplink transmission of HARQ Process #0 is performed, since the antenna port 2 is allocated to HARQ Process #1, if the pilot signal is transmitted on Symbol X, the UE derives that no uplink data mapping is performed on the resource elements of Symbol X which are corresponding to the antenna port 2. That is, no uplink data mapping is performed on Subcarriers 2, 3, 8, and 9 of Symbol X. In addition, since the DMRS is transmitted for HARQ Process #0 using the antenna port 0, no uplink data mapping is performed on Subcarriers 0, 1, 6, and 7 of Symbol X. Assuming that the uplink grant allocated by the base station to the UE is Symbols X, (X+1), (X+2), the UE perform the uplink data mapping on Subcarriers 4, 5, 10, 11 of Symbol X, and all resources of Symbols (X+1) and (X+2).

According to an embodiment of the present disclosure, the correspondence between the antenna ports and the HARQ process IDs or the correspondence between the antenna ports and the transmission occasions may be established. After determining the HARQ process ID corresponding to the transmission occasion at which the uplink transmission will be performed, according to the HARQ process ID or transmission occasion, the UE may determine the antenna port to be used, and the antenna ports to be used by other HARQ processes, and does not perform the uplink data mapping on the resource elements which are corresponding to the antenna ports used by the HARQ process and other HARQ processes, on the symbol where the pilot signal is located.

Figure 6A:
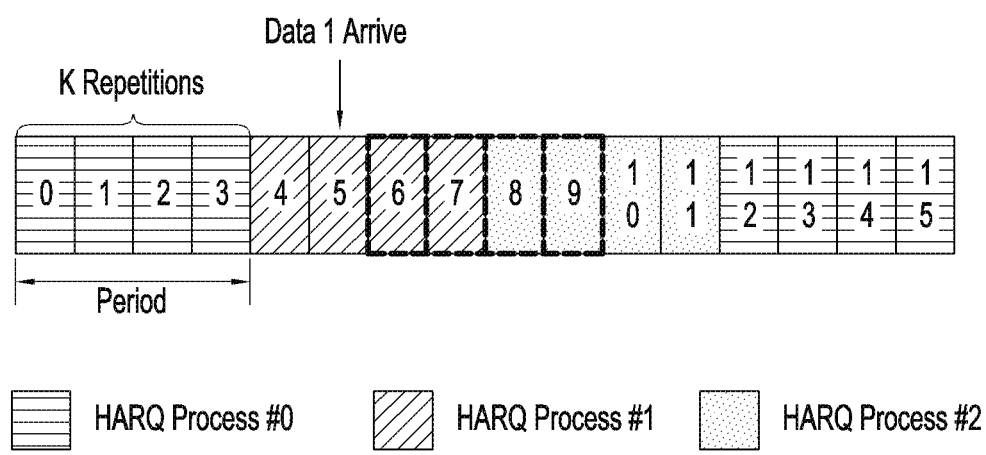
FIG. 6a illustratively shows a schematic diagram of resource mapping of an uplink data transmission according to an embodiment of the present disclosure.

In particular, when the transmission period in the configured uplink grant is greater than or equal to the time length occupied by K repetitions, the K transmissions (repetitions) of the UE only occupy resources of two HARQ processes corresponding to two adjacent transmission occasions. If the number of HARQ processes is greater than or equal to 2 in this configuration, only the IDs of the two HARQ processes need to be distinguished. Specifically, if the base station configures HARQ Process #0~2, i.e., a total of 3 HARQ processes, the base station may configure a correspondence between each HARQ process and an antenna port for the UE. When the UE performs the uplink data mapping, it only needs to avoid the resources of the HARQ processes that may be occupied by the K retransmissions. That is, according to the HARQ process ID corresponding to other transmission occasions occupied by transmitting the uplink data from the transmission occasion and the at least one antenna port corresponding to the HARQ process ID, the uplink data mapping is performed on the resource elements other than the resource elements corresponding to the at least one antenna port and the antenna port corresponding to the current HARQ process ID, on the symbol where the pilot signal is located. As shown in FIG. 6a, in one example, Data 1 arrive at the location of Resource 5, and are repeated 4 times from Resource 6 to Resource 9, occupying resources of HARQ Process #1 and HARQ Process #2. As configured by the base station, HARQ processes #0, 1 and 2 correspond to antenna ports 0, 2 and 4, respectively. It is assumed that the antenna ports 0, 2, and 4 occupy different time domain or frequency domain resources, respectively. For Symbol X, the UE needs to transmit the DMRS of HARQ Process #1 on the antenna port 2 and to avoid the resource elements occupied by the antenna port 4 (corresponding to HARQ Process #2) from uplink data mapping, but does not need to avoid the resource elements occupied by the antenna port 0.

According to another embodiment of the present disclosure, only the correspondence between the first HARQ process ID and the antenna port may be configured, and the antenna ports corresponding to the remaining HARQ processes may be periodically alternated. For example, the antenna port alternates periodically started from the start position of the configured uplink grant. As mentioned above, in a specific configuration, for example, the transmission period in the configured uplink grant being greater than or equal to the time length occupied by K repetitions, K repetitions of one transmission (repetition) may only cross the boundary of one transmission period (that is, crossing two HARQ processes). Therefore, using two antenna ports can avoid misunderstanding of the HARQ process between the UE and the base station. Specifically, as shown in FIG. 6a, the start position of the configured uplink grant is Resource 0, and the transmission period is P. According to the predefined rule, the antenna port 0 is used for HARQ Process #1, the antenna port 1 is used for HARQ Process #2, the antenna port 2 is used for HARQ Process #3, and so on. The start position of the configured uplink grant may be determined by at least one of the following time counters: system frame, subframe, slot, symbol, millisecond, second (for example, the base station configures an absolute start time for the UE), or may be determined according to the uplink resource positions indicated by the activation DCI. The UE derives the used antenna port and HARQ ID for an uplink transmission according to the predefined rule based on the position where the first transmission is started (such as symbol/slot/subframe/frame) (i.e., the transmission occasion where the start position of the uplink transmission is located). For example, the HARQ process ID is determined according to the predefined correspondence between the transmission occasions and the HARQ process IDs, and the antenna port is determined according to the correspondence between the HARQ process IDs and the antenna ports. Started from each possible transmission occasion, the base station may detect the pilot signal (for example, DMRS) corresponding to the uplink data on the antenna port corresponding to each transmission occasion according to the position of the time domain resource, determines the HARQ process ID of the uplink data according to the correspondence between the antenna port of the detected pilot signal and the HARQ process ID, and provides the UE with a new schedule for a retransmission or a new transmission.

Specifically, for the configured uplink grant (configured UL grant), the antenna port number associated with the first symbol of the uplink transmission is determined by the following formula:

$$\text{Antenna Port} = [\text{floor}(\text{CURRENT\_symbol/Period (or Set of Transmission Occasions)})] \bmod \text{Number of Antenna Port(s)},$$

where CURRENT_symbol=(SFN×numberOfSlotsPerFrame×numberOfSymbolsPerSlot+Slot Number in the Frame)×numberOfSymbolsPerSlot+Symbol Number in the Slot). Preferably, the number of antenna ports is 2 or more.

In the above method, the first uplink transmission uses the antenna port corresponding to the HARQ process regardless of which of the resources for one HARQ process the first uplink transmission occupies.

According to another embodiment of the present disclosure, more antenna ports may be utilized to further indicate a start position in more detail. For example, among the K resources occupied by one HARQ process, different antenna ports may be selected for different start positions. As shown in FIG. 6a, there are 4 resources in each HARQ process, thus the transmission occasions where the start positions of the uplink transmissions actually transmitted in one transmission period are located may be indicated by 4 antenna ports. For example, the first to fourth resources in one transmission period correspond to Antenna ports 0~3. In the example of FIG. 6a, the data are transmitted at Resources 6~9, the position of the first transmission (repetition) is Resource Block 6 in the second transmission period, and the relative position of Resource Block 6 in the second transmission period is the third resource. Thus, according to the predefined rule or as configured by the base station, the antenna port 2 needs to be used. Even if the base station detects the uplink transmission only on Resource 8, the base station may determine the antenna port 2 according to the detected DMRS, and then determine HARQ Process #1 according to the correspondence between the antenna ports and the HARQ process IDs, since the K repetitions only cross one a transmission period. In addition, for the case of non-all-zero RV (for example, the UE may perform data transmission from the first resource in round robin of different RVs), the base station may further determine the specific position of the actual uplink transmission by detecting the DMRS on the antenna port, and thus may find the RV version number correctly corresponding to the current TTI. Alternatively, the base station may store the uplink data that may have been received at the TTI position previously. After detecting the DMRS, the base station may read and decode the previously received uplink data at the TTI position from the memory to ensure the reliability of the uplink data transmission. In this embodiment, when the DMRS is detected by the base station, the start position of the transmission may be directly determined. If the period is greater than or equal to the time domain resources occupied by the K repetitions, the confusion of the HARQ process IDs may be avoided.

According to the embodiments of the present disclosure, the UE may avoid other antenna ports or do not avoid other antenna ports for the uplink data mapping, or may perform the uplink data mapping according to the predefined rule or as configured by the base station.

Moreover, according to another embodiment of the present disclosure, different orthogonal or quasi-orthogonal sequences may be configured for the antenna ports to indicate different HARQ processes or different transmission start positions.

Further, according to another embodiment of the present disclosure, the uplink data transmission may be performed by piggybacking Uplink Control Information (UCI) on the physical layer, and the HARQ process ID is indicated by the UCI.

According to another embodiment of the present disclosure, the base station may configure a plurality of configured uplink grants for the UE, each configured uplink grant including only one HARQ process, and configure that the UE may start the uplink transmission at any start position in the transmission period. According to such a method, the confusion of the HARQ process IDs may be avoided. In order to reduce the decoding complexity of the base station, an all-zero RV may be configured. The plurality of uplink grants are respectively corresponding to different HARQ processes. If other uplink data need to be transmitted before the timer for the configured uplink grant expires, the transmission may be performed on the resources corresponding to different HARQ processes, thereby avoiding the confusion of the HARQ process IDs.

According to another embodiment of the present disclosure, the base station may configure a plurality of configured uplink grants, wherein each configured uplink grant may include a plurality of HARQ processes. In order to reduce the decoding complexity of the base station, it is specified that the transmission can only be performed at the start position of each transmission period. In order for the UE to perform the uplink transmission at any time in any TTI/symbol/slot/subframe, the plurality of configured uplink grants may indicate that the transmission may be started on different TTIs/symbols/slots/subframes.

The time-frequency resources configured by the plurality of configured uplink grants in the above two methods may be determined by the base station, may be orthogonal by FDM or TMD, or may be all or partially overlapping time-frequency resources. More specifically, the configured time-frequency resources may be on the same or different carriers, and/or on the same or different BWPs.

Figure 6B:
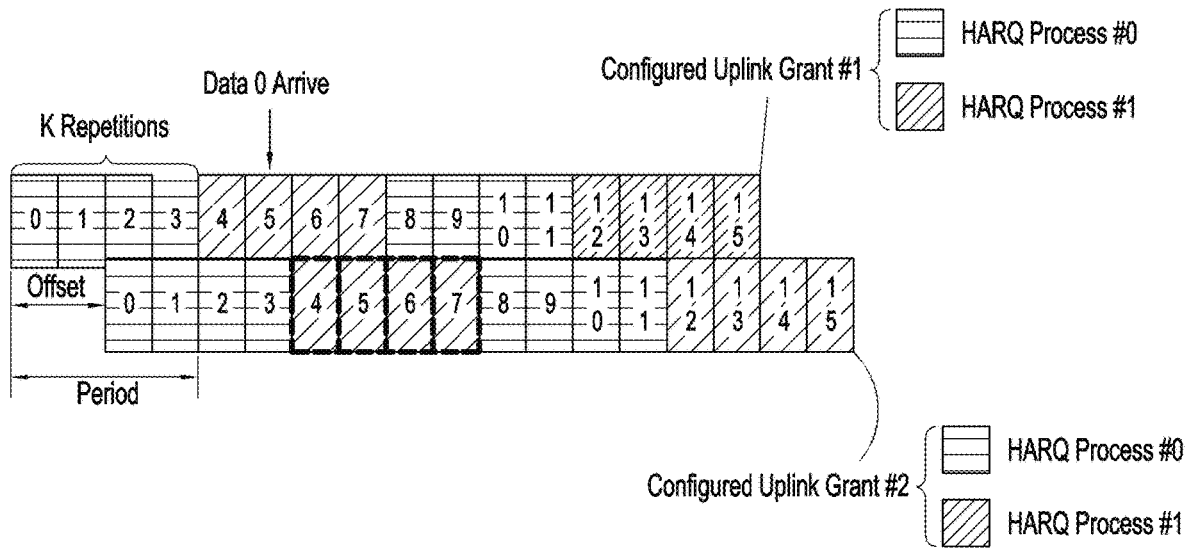
FIG. 6b illustratively shows a schematic diagram of uplink data transmission when there are a plurality of configured UL grants according to an embodiment of the present disclosure.

FIG. 6b illustratively shows a schematic diagram of uplink data transmission when there are a plurality of configured UL grants according to an embodiment of the present disclosure. The base station configures and/or activates a plurality of configured uplink grants to the UE, where the HARQ processes in each configured uplink grant are the same, but the antenna ports and/or DMRS sequences in each configured uplink grant are different. Specifically, as shown in FIG. 6b, the base station configures and/or activates two configured uplink grants, that is, configured uplink grant #1 and configured uplink grant #2 to the UE. The HARQ process IDs in each of the configured uplink grants are #0 and #1, but the antenna port configured in the configured uplink grant #1 is port 0, and the antenna port configured in the configured uplink grant #2 is port 1. Then, when Data 0 arrives at the data resource 5 of the configured uplink grant #1 (which corresponds to the data resource 3 of the configured uplink grant #2), the nearest transmission opportunity is selected for uplink transmission, that is, Data 0 is transmitted in the #4~#7 symbols of the configured grant #2. Then, the antenna port used for this transmission is port 1. In this case, if the data resources of the configured uplink grant #1 and the configured uplink grant #2 are partially or completely overlapped, the base station may determine the start position of the transmission of the UE by detecting the antenna port and/or the DMRS sequence. For example, if the base station detects that the antenna port is port1 at the position of the data resource 6 of the configured uplink grant #1 (which corresponds to the data resource 4 of the configured uplink grant #2) in FIG. 6b, the base station may determine the start position of the actual transmission resource occupied by the UE according to the antenna port and/or DMRS sequence corresponding to each configured uplink grant configured to the UE, thereby performing correct detection.

Optionally, some configurations used in the plurality of configured uplink grants may be the same, such as one or more of the following: time domain resource allocation (TDRA), number of symbols of each data resource, number of repetitions k, Frequency domain resource allocation (FDRA), periodicity. The plurality of configured uplink grants may be determined by introducing an offset. Specifically, the base station may configure the TDRA and FDRA for the first set of configured uplink grant, and the start position and/or the position of each data resource of the second set of configured uplink grant are based on those of the first set of configured uplink grant and are determined based on the offset configured by the base station. As shown in FIG. 6b, the base station configures the same time domain and/or frequency domain resource allocation and period information for the two sets of configured uplink grants. In addition, the base station configures an offset to the UE. The UE determines, according to the time domain and/or frequency domain resource allocation and the period information configured by the base station, the start position of each period and/or the time-frequency resource position (position of each data resource) of the first set of configured uplink grant. The UE further determines, according to the start position of each period and/or the time-frequency resource position (position of each data resource) of the first set of configured uplink grant and the offset, the start position of each period and/or the time-frequency resource position (position of each data resource) of the second set of configured uplink grant.

Figure 6C:
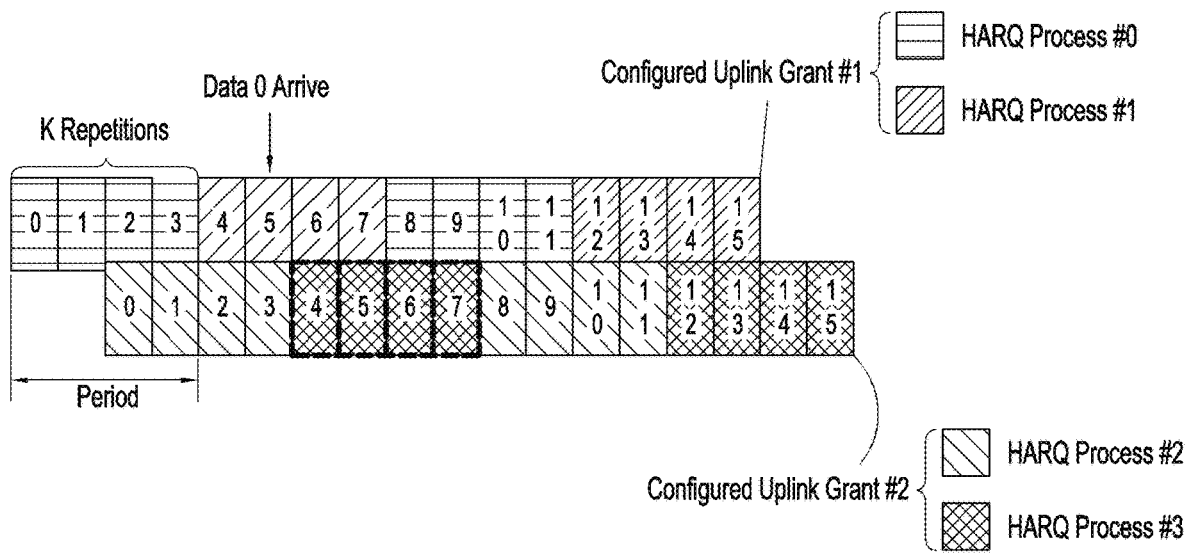
FIG. 6c illustratively shows a schematic diagram of uplink data transmission when there are a plurality of configured UL grants according to an embodiment of the present disclosure.

In FIG. 6c, the base station configures and/or activates a plurality of configured uplink grants to the UE, wherein each of the configured uplink grants has different HARQ processes, and each of the configured uplink grants may have the same or different antenna ports and/or DMRS sequences. Specifically, as shown in FIG. 6c, the base station configures and/or activates two configured uplink grants, that is, configured uplink grant #1 and configured uplink grant #2 to the UE. The HARQ process IDs in the configured uplink grant #1 are (HARQ process ID) #0 and #1, and the HARQ process IDs in the configured uplink grant #2 are (HARQ process ID) #2 and #3. In addition, the antenna port configured in the configured uplink grant #1 is port 0, and the antenna port configured in the configured uplink grant #2 is port 1. Then, when Data 0 arrives at the data resource 5 of the configured uplink grant #1 (which corresponds to the data resource 3 of the configured uplink grant #2), the nearest transmission opportunity is selected for uplink transmission, that is, Data 0 is transmitted in the #4~#7 symbols of the configured grant #2. Then, the antenna port used for this transmission is port 1. In this case, if the data resources of the configured uplink grant #1 and the configured uplink grant #2 are partially or completely overlapped, the base station may determine the start position of the transmission of the UE by detecting the antenna port and/or the DMRS sequence. For example, if the base station detects that the antenna port is port 1 at the position of the data resource 6 of the configured uplink grant #1 (which corresponds to the data resource 4 of the configured uplink grant #2) in FIG. 6c, the base station may determine the HARQ process ID corresponding to the uplink data and the start position of the actual transmission resource occupied by the uplink data according to the antenna port and/or DMRS sequence corresponding to each configured uplink grant configured to the UE, thereby performing correct detection. When each configured uplink grant has different time domain and/or frequency domain resources, they can be configured with the same antenna port and/or DMRS. In this case, different uplink grants and/or HARQ process IDs may be distinguished according to different time domain and/or frequency domain resources.

Optionally, each configured uplink grant may include only one HARQ process ID, and each configured uplink grant may be configured with the same or different antenna ports and/or DMRSs.

Figure 7:
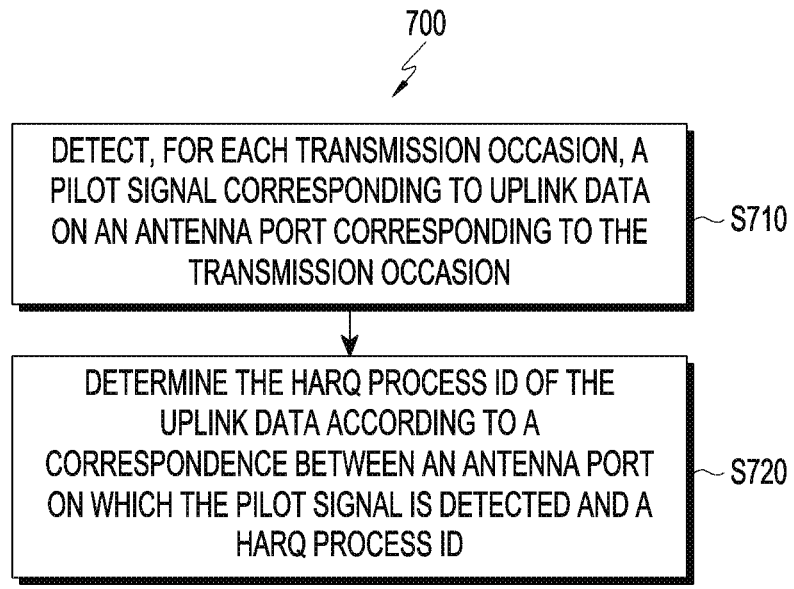
FIG. 7 illustratively shows a flowchart of a method of determining a HARQ process ID of uplink data performed at a base station according to an exemplary embodiment of the present disclosure.

FIG. 7 illustratively shows a flowchart of a method of determining a HARQ process ID of uplink data performed at a base station according to an exemplary embodiment of the present disclosure.

As shown in FIG. 7, in step S710, for each transmission occasion, a pilot signal corresponding to uplink data is detected on an antenna port corresponding to the transmission occasion.

When the pilot signal is detected, in step S720, the HARQ process ID of the uplink data is determined according to a correspondence between an antenna port on which the pilot signal is detected and a HARQ process ID.

Resource Mapping Method for which a Repetition is Performed in A Unit of a Mini-Slot In the NR system, the base station may configure any number of symbols in one slot for the UE as a time domain resource allocation for an uplink transmission or downlink transmission. Generally, if the allocated resources are less than the number of symbols in one slot, they are called a mini-slot. In a narrow sense, the resources whose number of symbols is less than a half of the number of symbols in the slot may be referred to as a mini-slot. Herein, a set of OFDM symbols for the time domain resource allocation for the uplink or downlink transmission is replaced with a mini-slot, wherein the number of symbols is less than the number of symbols in one slot as defined in the system. In the NR system, when PUSCH or PUCCH or PDSCH is transmitted repeatedly, only one transmission is supported in each slot, and the PUSCH or PUCCH or PDSCH is repeatedly transmitted at the same time domain positions of different slots. Although it is possible to avoid the repetition by allocating more symbols to the UE for one transmission, it is still impossible to avoid the problem that data cannot be transmitted until the time in each slot that it is allowed to be transmitted if there are data need to be transmitted. Therefore, it is difficult to meet the requirements of low latency in this architecture.

According to an embodiment of the present disclosure, the configured uplink or downlink grant may configure resources for the uplink or downlink transmission in a unit of a mini-slot, and support a plurality of transmissions (repetitions) in one slot. Hereinafter, the uplink grant is taken as an example for discussion.

Figure 8:
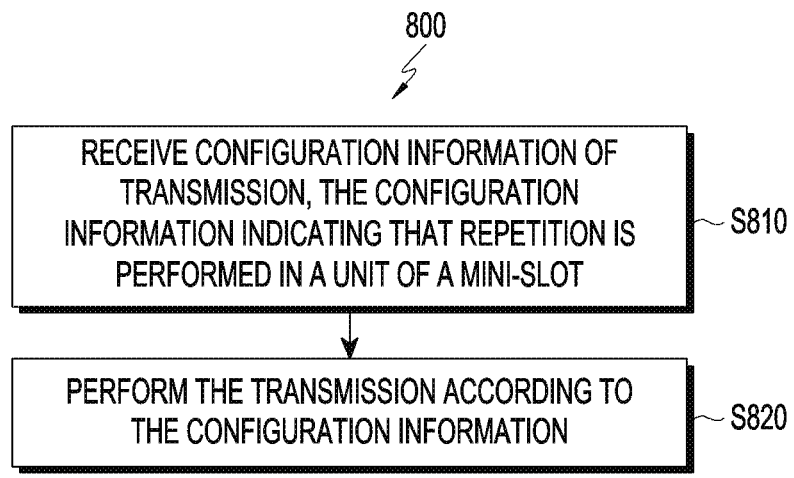
FIG. 8 illustratively shows a flowchart of a transmission method for which a repetition is performed in a unit of a mini-slot according to an embodiment of the present disclosure.

FIG. 8 illustratively shows a flowchart of a transmission method for which a repetition is performed in a unit of a mini-slot according to an embodiment of the present disclosure.

As shown in FIG. 8, in step S810, the UE receives configuration information. The configuration information includes: information indicating that a repetition of time-frequency resource information is performed in a unit of a mini-slot. According to an embodiment of the present disclosure, the configuration information indicating that the repetition being performed in the unit of the mini-slot is supported may further include information indicating that the repetition is or is not allowed to cross a slot boundary, to further indicate the resource mapping method for which the repetition is performed in the unit of the mini-slot.

Then in step S820, the UE performs a transmission according to the configuration information. The transmission may include an uplink transmission and a downlink transmission.

In an embodiment according to the present disclosure, it is specified by the configuration information that the repetition being performed in the unit of the mini-slot may be supported. This configuration information can be transmitted on an RRC signaling or MAC signaling or physical layer signaling (such as DCI). For the configuration information, the physical layer signaling may be the DCI for the configured uplink transmission. When receiving the configuration information, the UE may perform the uplink transmission in a manner of repeating in the unit of the mini-slot, or receive the downlink transmission from the base station in a manner of repeating in the unit of the mini-slot.

Several time domain resource mapping methods for which the repetition is performed in the unit of the mini-slot are described below. The following methods may be used for the uplink data and/or control information, such as PUCCH and/or PUSCH. The methods described below are applicable to the configured UL grant (including two cases that requires and does not require an activation DCI), a single PUSCH scheduling indicated by the DCI, and PUCCH transmissions in various formats.

Method One, in which in one slot, the mapping of the mini-slot is continuously performed, and one transmission (repetition) (or transport block (TB)) does not cross the slot boundary.

Figure 9:
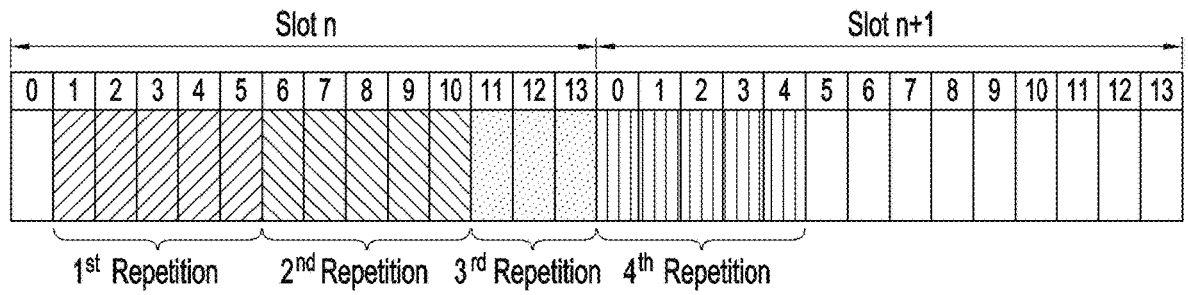
FIG. 9 illustratively shows a schematic diagram of resource mapping for which a repetition is performed in a unit of a mini-slot according to an embodiment of the present disclosure.

If the repetition (transmission) needs to be mapped to the next slot, in the next slot:

Method A: Starting the mapping from the first uplink symbol of the next slot (as shown in FIG. 9), Method B: Starting the mapping according to the time domain symbol which is resource allocated in the current slot;

If the mapping of one repetition (transmission) cannot be completed in the current slot, for the current slot:

Method X: Mapping on the remaining symbols (as shown in FIG. 9), wherein the data mapping method may include:

Method 1, in which the UE performs the rate matching according to the number of the remaining symbols in the current slot, Method 2, in which a part of symbols are selected for mapping according to a predefined rule, e.g., Mapping sequentially according to the previous code rate, and puncturing the rest that is not enough for one transmission, Mapping only the data portion, and not mapping the pilot;

Method Y: Not mapping on the remaining symbols, which specifically includes: 1) postponing the transmission to the next slot, wherein the mapping method on the next slot may be Method A or Method B as previously discussed; 2) Or, dropping the repetitions that should have been transmitted on the remaining symbols, i.e., counting as the number of repetitions without performing the actual transmission.

If the mapping of one repetition cannot be completed in the current slot and the mapping is performed on the remaining symbols of the current slot, the number of symbols of the first repetition (transmission) on the next slot is determined by at least one of:

Method M: the number of symbols of a complete repetition (transmission) in the next slot, that is, a complete transmission being performed on the next slot.

Method N: the number of symbols left for a complete repetition (transmission) after the complete repetition (transmission) is partially mapped on the remaining symbols of the current slot, wherein the data mapping method on the remaining symbols of the current slot may include:

Method 1, in which the UE performs the rate matching according to the number of the remaining symbols in the current slot;

Method 2, in which a part of symbols are selected for mapping according to a predefined rule, e.g., Mapping sequentially according to the previous code rate, and puncturing the rest that is not enough for one transmission, Mapping only the data portion, and not mapping the pilot.

The first uplink symbol of the next slot as described in Method A is at least one of: the first available symbol for uplink transmission; the first symbol of the first consecutive uplink symbols that may be continuously and completely transmitted, wherein the number of the first consecutive uplink symbols is the number of symbols of the first repetition (transmission) on the next slot, which may be determined by Method M or N as previously discussed. For TDD system, or FDD system configured with the available uplink transmission units, the resource mapping of the uplink transmission may be performed by referring to the rules to be described in "Resource Mapping Method of TDD System" below, in which the first symbol in the next slot on which the first repetition (transmission) may be performed is the first uplink symbol of the next slot as described in Method A. That is, in the following "Resource Mapping Method of TDD System", a plurality of repetitions in one slot is taken as an example for illustration, but the resource mapping method of the uplink transmission may be extended to different slots.

In addition, Method M or Method N is selected as indicated by the base station or according to the predefined rule. Furthermore, for the combination of Method X and Method M, the total number of two transmissions (or recorded as one transmission) that cross the slot boundary may be large. Then, in order that the base station do not need to consider various combinations when performing resource allocation, Method M may be improved according to a certain rule (referred to as Method M'): if one transmission cannot be completely mapped on the current slot n, the sum of the number a of symbols of the transmission mapped on the remaining symbols in Slot n and the number b of symbols of the transmission mapped on Slot (n+1) is not greater than a predefined value y (e.g., 14 symbols); if the sum is greater than the value y, only b=y−a symbols are mapped on Slot (n+1). Alternatively, if the sum of the number a of symbols of the transmission mapped on the remaining symbols of Slot n and the number b of symbols of the transmission mapped on Slot (n+1) is greater than the value y, each of the repetition (transmission) mapped on the remaining symbols in Slot n and the repetition (transmission) mapped on Slot (n+1) is counted as one repetition, that is, the repetition on both sides of the boundary between Slot n and Slot (n+1) is regarded as two repetitions; otherwise, it is counted as two parts of one repetition, that is, the repetition mapped on the remaining symbols of Slot n is the first part of the repetition, and the repetition mapped on Slot (n+1) is the second part of the repetition. y may be predefined, or calculated according to a rule (e.g., y=1.5 times (number of symbols occupied by one repetition)), or configured by the base station.

Figure 10:
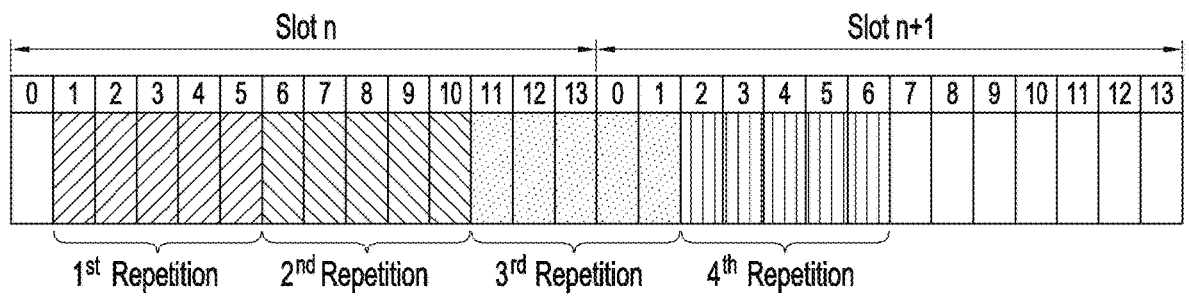
FIG. 10 illustratively shows a schematic diagram of resource mapping for which a repetition is performed in a unit of a mini-slot according to an embodiment of the present disclosure.

Specifically, as shown in FIG. 9, the base station configures the uplink grant for the UE by DCI or RRC, wherein the number of repetitions k=4, and the time domain resources are OFDM Symbols 1~5 in Slot n, i.e., 5 symbols in total. There are 14 symbols per slot. The base station configures the UE with the capability of performing repetitions in the unit of the mini-slot. The UE performs the first repetition on Symbols 1~5, the second repetition on Symbols 6~10, and the third repetition on Symbols 11~13 since the slot boundary cannot be crossed. For Method A and method M, the fourth repetition occupies Symbols 0~4 in Slot (n+1). For Method A and Method N, the fourth repetition or the second part of the third repetition (the first part of the third repetition being the part of Symbols 11~13 in Slot n) occupy Symbol 0~1 of Slot (n+1) (i.e., the part of the third repetition on Slot (n+1) as shown in FIG. 10). According to the above rule, the part of the third repetition on Slot n as shown in FIG. 10 may be taken as the first part of the third repetition, and the part of the third repetition on Slot (n+1) as shown in FIG. 10 may be taken as the second part of the third repetition; or the part of the third repetition on Slot n as shown in FIG. 10 may be taken as the third repetition, and the part of the third repetition on Slot (n+1) as shown in FIG. 10 may be taken as the fourth repetition. For Method B, according to the resource allocation of the base station, the fourth repetition is mapped on Symbols 1~5 of Slot (n+1).

Furthermore, there is a defect that too few symbols (for example, less than 3 symbols or predetermined m symbols, where m may be a value predefined in the protocol or configured by the base station) may be occupied by the third repetition or the first part and/or the second part of the third repetition, and thus the performance cannot be satisfied. According to an embodiment of the present disclosure, this transmission may not be counted as one of the k repetitions. In this case, in the example of FIG. 9, the UE may perform the third transmission on Symbols 0~4 of Slot (n+1), and perform the fourth transmission on Symbols 5~9 of Slot (n+1).

Method Two, in which mapping on mini-slots is continuously performed in one slot, and the repetition is allowed to cross the slot boundary.

As shown in FIG. 10, the base station configures the uplink grant for the UE by DCI or RRC, wherein the number of repetitions k=4, and the time domain resources are OFDM Symbols 1~5 in Slot n, i.e., 5 symbols in total. There are 14 symbols per slot. The base station configures the UE with the capability of performing repetitions in the unit of the mini-slot. The UE performs the first repetition on Symbols 1~5, and the second repetition on Symbols 6~10. Since the repetition is allowed to cross the slot boundary, the UE performs the third repetition on Symbols 11~13 of Slot n and Symbols 0~1 of Slot (n+1), and the fourth repetition on Symbols 2~6 of Slot (n+1).

In addition, the resource mapping method provided above may be configured by the base station to the UE semi-statically (for example, configured by the RRC) or dynamically (for example, indicated by the DCI). It is also possible to select one of them to perform the mapping according to the predefined condition. For example, for Method X and Method Y given in Method One, a threshold of the number of the remaining symbols or the rate-matched code rate may be predefined or configured, in order to select Method X or Method Y. Specifically, if the number of the remaining symbols of the current slot is less than (or less than or equal to) the threshold, no mapping is performed (Method Y), otherwise, the mapping is performed (Method X). Alternatively, when Method X is used and the code rate after the rate matching is performed according to the number of the remaining symbols is greater than the threshold (for example, 0.93), no mapping is performed (Method Y), otherwise the mapping (Method X) is performed. That is because, at this time, the code rate cannot support stand-alone decoding even if the mapping is performed. Similarly, it may also be determined whether the transmission is counted as one repetition according to a threshold. Specifically, if the number of the remaining symbols of the current slot is less than (or less than or equal to) the threshold, the mapping on the remaining symbols of the current slot is not counted as one repetition, otherwise it is counted as one repetition. Alternatively, when the rate-matched code rate is greater than (or greater than or equal to) the threshold, the mapping on the remaining symbols of the current slot is not counted as one repetition, otherwise it is counted as one repetition. Similarly, for Method M and Method N given in Method One, a threshold of the number of the remaining symbols or the rate-matched code rate may be predefined or configured, in order to select Method M or Method N. Specifically, if the number of the remaining symbols of the current slot is less than (or less than or equal to) the threshold, the mapping is performed on symbols of the next slot, wherein the number of the symbols on the next slot is the number of symbols occupied by one repetition (Method M); otherwise, the mapping is performed on symbols of the next slot, wherein the number of the symbols on the next slot is the number of symbols left for one complete repetition after the complete repetition is partially mapped on the remaining symbols of the current slot (Method N). Alternatively, if selecting Method N for mapping would result in the rate-matched code rate greater than (or greater than or equal to) the threshold, the mapping is performed according to Method M, otherwise the mapping is performed according to Method N.

For example, there may be such a case that the number of the remaining symbols in the current slot is too small or the number of symbols of the first repetition (transmission) on the next slot determined by Method N is too small, for example, one symbol or two symbols, and the pilots for demodulation (e.g., DMRS) need to be transmitted simultaneously in these symbols. Then, in this case, the number of resource elements (REs) that may be used to transmit data may be small, or even null (for example, when there is only one symbol left, and a waveform is transmitted using DFT-S-OFDM). In this case, the transmission on these few remaining symbols is of limited help for performance improvement, but increases the power consumption of the UE. Then, the transmission may not be performed on these symbols, that is, Method Y as previously described may be used in this case.

In another example, the pilots and/or data are still transmitted in this case. At this time, if the pilots are transmitted in the remaining symbols of the current slot, a joint channel estimation may be performed with the pilots in adjacent repetitions in the same slot, in order to improve the channel estimation accuracy; if only the data part is transmitted in the remaining symbols of the current slot, the demodulation of this part of data may use the pilots in the adjacent repetitions in the same slot for channel estimation (which may be recorded as pilot sharing); if both the pilots and the data are transmitted in the remaining symbols of the current slot, the pilot sharing may be supported, i.e., the joint channel estimation may be performed with the pilots in the adjacent repetitions in the same slot. The UE may decide whether to transmit the pilots, or signals, or pilots and signals in the remaining symbols of the current slot and/or the first repetition of the next slot, as configured by the base station or according to a predefined rule. This function may be enabled or disabled as configured by the base station, or it may be predefined that the repetitions in the same slot may be transmitted from the same antenna port (i.e., the same channel is experienced, and the joint channel estimation or combination may be performed), or it may be predefined that the repetitions in the same slot are not transmitted from the same antenna port (i.e., the joint channel estimation cannot be performed). Alternatively, whether the joint channel estimation or combination is performed may be derived based on whether the pilot corresponding to the same antenna port is used for the respective repetitions. For example, if the same antenna port is used for each repetition, the joint channel estimation may be performed; otherwise the joint channel estimation cannot be performed. The pilot sharing as previously described may also be applicable for all the repetitions in the same slot. It may be determined whether the pilot sharing as previously described is applicable for all of the repetitions or only for an incomplete repetition as configured by the base station or according to a predefined rule. Furthermore, the above methods may be extended to the repetition on different slots. That is, it may be determined whether the pilot sharing as previously described is applicable for the repetitions on different slots as configured by the base station or according to a predefined rule.

The above methods mainly describe how to perform the repetition in mini-slot when it reaches the slot edge. If the amount of the allocated resources is greater than or equal to the number of symbols in one slot, when it reaches the slot edge, the mapping may be performed using any one or more of the above methods. In addition, similar to the case where the slot edge cannot guarantee phase continuity, one transmission (repetition) (if the number of the configured symbols is greater than the number of consecutive symbols that may be used for the uplink or downlink transmission) may need to be segmented into a plurality of transport blocks due to the DL/UL transmission direction configured in the system. That is, when it reaches an uplink and downlink switching point, the number of consecutive symbols occupied by each transport block may also be smaller than that the number of symbols in one slot, which may also be used as a mini-slot. The transport block may also be referred to as one repetition or one transmission. The above method is also applicable to the case where the number of consecutive symbols (mini-slot) is smaller than the number of symbols in the resources of each allocation due to the DL/UL transmission direction.

DMRS Transmission Method

As described above, if one transmission cannot be completely mapped on the current slot, the mapping may be performed on the remaining symbols of the current slot. At this time, the number of the remaining symbols of the current slot is less than the number of symbols of one complete repetition (transmission). Alternatively, due to the DL/UL transmission direction, one transmission is segmented into two or more non-consecutive transmissions. For Type A, the insertion of the pilot symbols is performed in the unit of the slot or mini-slot (in this case, the set of consecutive symbols occupied by a transmission is referred to as a mini-slot). The mini-slots may correspond to the start positions of the respective ones of the plurality of transmissions which are segmented due to the configured number of symbols being less than 14 or due to the slot edge or the DL/UL direction. For the Type B pilot pattern of the PUSCH, the first symbol of one of the transmissions is a front-load uplink pilot thereof, that is, the front-load uplink pilot is placed on the first symbol of one transmission. Then, for one PUSCH transmission that is partially mapped on the remaining symbols of the current slot, its pilot is also mapped on the first symbol in the transmission. If there are an additional pilot:

Method a: a pattern of the additional pilot is selected according to the number of symbols actually occupied by the transmission.

Method b: a pattern of the additional pilot is selected according to the number of symbols occupied by one complete repetition (transmission).

Figure 11:
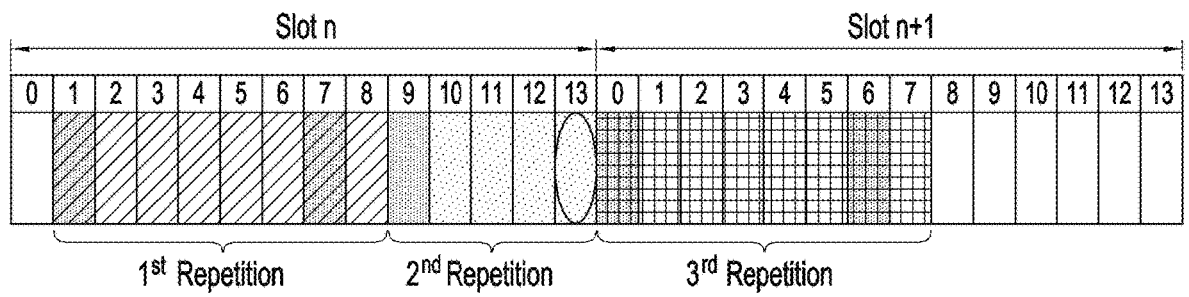
FIG. 11 illustratively shows a schematic diagram of a pattern of a pilot symbol according to an embodiment of the present disclosure.

As shown in FIG. 11, one complete repetition (transmission) occupies 8 symbols. Then, according to a predefined rule (for the transmission containing 5-7 symbols, placing pilots on the first and fifth symbols; for the transmission containing 8-9 symbols, placing pilots on the first and seventh symbols), an additional pilot is inserted on the first and the seventh symbols when there is the additional pilot. Then as for the second repetition, for Method a, since there are only 5 symbols remaining in Slot n, the pilot of the second repetition is placed on Symbol 9 and Symbol 13 of Slot n, i.e., on the first and fifth symbols of the second repetition. For Method b, the pilot of the second repetition is placed only on Symbol 9 of Slot n, and the additional pilot (which should be placed on the seventh symbol of the second repetition according to Method b) is not transmitted with other data (since there are only 5 symbols remaining in Slot n). The above two methods a and b may be selected as configured by the base station.

As described above, if one transmission cannot be completely mapped on the current slot, and the mapping is performed on the remaining symbols of the current slot, the number of symbols of the first repetition (transmission) on the next slot may be determined by the number of symbols left for one complete repetition after the complete repetition is partially mapped on the remaining symbols of the current slot. At this time, similarly, the pilot position on the next slot may be obtained according to the following methods:

Method a': the pattern of the pilot is determined according to the number of symbols actually occupied in the next slot.

Method b': the pattern of the pilot is determined according to a virtual repetition (transmission) consisting of two parts transmitted on two slots (the current slot and the next slot).

In Method a', it may be guaranteed that each of the two parts of transmissions (i.e., the transmission mapped on the remaining symbols of the current slot and the transmission mapped on the next slot) has the pilot symbol, so that each of the two parts of transmissions may be decoded as one transmission (i.e., the two parts of transmissions are taken as two transmissions). However, Method b' cannot guarantee that each of the two parts of transmissions has the pilot symbol. Then, in this case, it is required that the phases of the two slots (the current slot and the next slot) are continuous, so that channel estimation across symbols may be performed.

Figure 12:
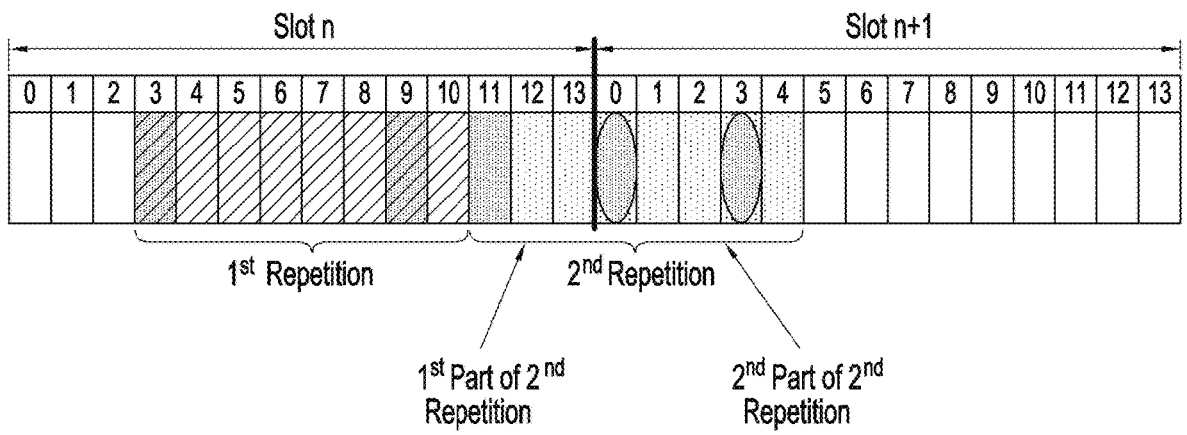
FIG. 12 illustratively shows a schematic diagram of a pattern of a pilot symbol in accordance with one embodiment of the present disclosure.

As shown in FIG. 12, the first part of the second repetition is in Slot n, and the second part is in Slot (n+1). According to Method a', the pattern of the pilot is determined according to the number of symbols actually occupied by this transmission on the next slot. The second part of the second repetition occupies 5 symbols on Slot (n+1). Then, the pilot is transmitted on Symbol 0 of Slot (n+1) according to the pilot pattern of Type B. For Method b', the first part and the second part of the second repetition are combined as a virtual transmission, and the time domain position of the pilot symbol is determined. i.e., at the seventh symbol of the virtual transmission. That is, the pilot is transmitted on Symbol 3 of Slot (n+1). The same method is also applicable to the case of "Method Two, in which mapping on mini-slots is continuously performed in one slot, and the repetition is allowed to cross the slot boundary" in Section of "Resource Mapping Method For Which A Repetition Is Performed In A Unit Of A Mini-Slot". That is, the same method may be extended from a slot to a mini-slot, i.e., the pilot is inserted based on the relative symbol position within each mini-slot according to Method a' or Method b'.

The above methods are described for the case where the number of symbols per transmission is different due to the edge of the slot. The above methods are also applicable to the case where one transmission is segmented into a plurality of transport blocks due to the DL/UL transmission direction. That is, the pilot position is determined according to the symbols occupied by the actual transmission in each transport block, or the pilot position is determined according to the symbols occupied by one virtual transmission consisting of all the transport blocks.

The above methods may be summarized as:

Method I: the time domain position of the pilot symbol is determined according to the number of symbols actually occupied by the repetition (transmission) in each slot or by each of the plurality of transport blocks segmented from one transmission.

Method II: the time domain position of the pilot symbol is determined according to the number of symbols occupied by each scheduled repetition (transmission), wherein each scheduled repetition (transmission) may be an actual transmission or a virtual transmission. Specifically, when one scheduled repetition crosses the slot boundary or when one transmission is segmented into a plurality of transport blocks for transmission due to the DL/UL transmission direction, the time domain position of the pilot symbol is determined according to the virtual transmission.

Resource Mapping Method for TDD System or FDD System Indicated by SFI

In the NR system, for a more flexible system configuration, a set of semi-static slot formats may be configured by RRC signaling to define configurations of uplink slots, downlink slots and flexible slots, and uplink symbols, downlink symbols, and flexible symbols. In addition, the slot format may also be indicated by dynamically overwriting the flexible slot or symbol by the DCI indicating the slot format, wherein the information indicated in the DCI indicating the slot format is a Slot Format Indication (SFI).

In the Time Division Duplexing (TDD) system or the FDD system indicated by the SFI of the NR, if the number of consecutive uplink symbols are smaller than the number of symbols occupied by one transmission (repetition) allocated to the UE, the repetition of the uplink transmission is not performed. However, this can neither satisfy the minimum latency, nor guarantee the reliability. According to an embodiment of the present disclosure, in order to obtain the minimum delay and the maximum reliability, one transmission (repetition) of the uplink transmission may be mapped on the non-consecutive uplink or downlink symbols. For the non-uplink symbols (such as the downlink symbols or flexible symbols) or downlink symbols, the uplink transmission or downlink transmission that should have been mapped to the symbol may be postponed or dropped. In particular, if the pilot signal (such as DMRS) is to be dropped, the entire transmission may be dropped, since the base station cannot perform channel estimation; or only the symbol where the DMRS is located may be dropped, then the base station may decode the transmission using the DMRS transmitted before and after. In this case, it is necessary for the UE to maintain the phase continuity.

Several methods of performing the mapping of the uplink transmission in the TDD system or the FDD system indicated by the SFI are given below.

Figure 13:
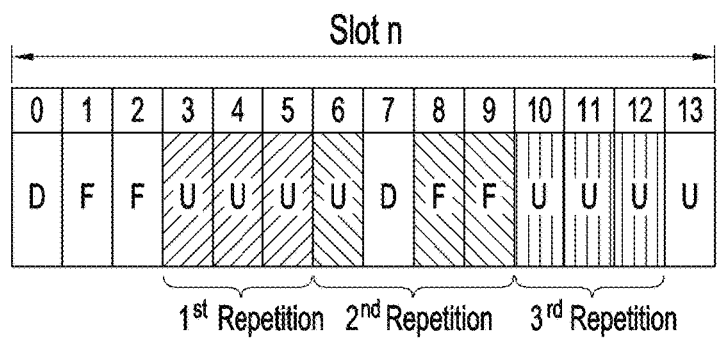
FIG. 13 illustratively shows a schematic diagram of resource mapping of a TDD system or an FDD system indicated by an SFI according to an embodiment of the present disclosure.

Method One, in which the mapping may be performed on the uplink symbol (U) and the flexible symbol (F). If the downlink symbol (D) is reached, the uplink transmission is mapped to the next uplink symbol (U) or flexible symbol (F). As shown in FIG. 13, it is assumed that the UE is configured to transmit the first repetition on Symbols 3~5 of Slot n. The second repetition should have been transmitted on the next Symbols 6~8. However, Symbol 7 is configured as a downlink symbol. Therefore, the second repetition is transmitted on Symbols 6 and 8~9. Next, the third repetition is transmitted on Symbols 10~12.

Figure 14:
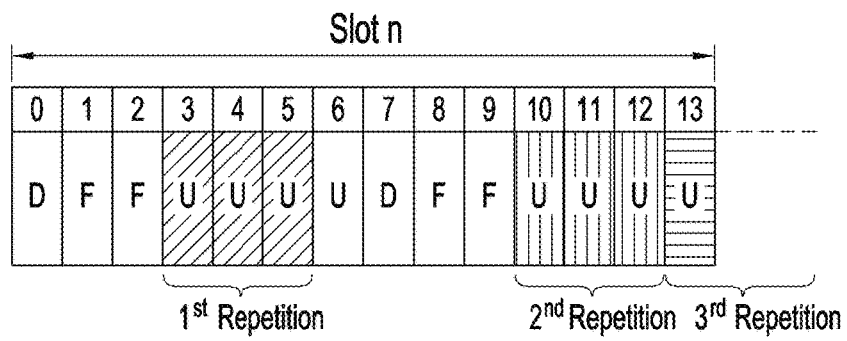
FIG. 14 illustratively shows a schematic diagram of resource mapping of a TDD system according to an embodiment of the present disclosure.

Method Two, A, in which the repetition is mapped to the consecutive uplink symbols only if the number of consecutive uplink symbols (U) is greater than or equal to the number of symbols of one repetition of the uplink transmission; otherwise, the repetition is mapped to the next consecutive uplink symbols. As shown in FIG. 14, it is assumed that the UE is configured to transmit the first repetition on Symbols 3~5 of Slot n. The next consecutive 3 uplink symbols are Symbols 10~12. Thus, the second repetition is transmitted on Symbols 10~12.

Method Two, B, in which the repetition is mapped to the consecutive uplink symbols or flexible symbols only if the number of consecutive uplink symbols (U) or flexible symbols (F) is greater than or equal to the number of symbols of one repetition of the uplink transmission; otherwise, the repetition is mapped to the next consecutive uplink symbols or flexible symbols. As shown in FIG. 14, it is assumed that the UE is configured to transmit the first repetition on Symbols 3~5 of Slot n. The next consecutive 3 uplink symbols are Symbols 8~10. Thus, the second repetition is transmitted on Symbols 8~10.

Method Two, A and Method Two, B may be considered as postponing in units of mini-slots. Similarly, the dropping may be performed in units of mini-slots. The advantage of postponing is to ensure that the actual number of transmissions is the same as that of the scheduling. But, the base station needs to consider the postponing when scheduling or allocating the uplink transmission. The advantage of dropping is that the base station only needs to be responsible for allocating a total number of resources without considering the case of postponing to the subsequent resources. The method of dropping is relatively simple for the scheduling of the base station, but cannot guarantee the condition of the actual transmission, that is, cannot guarantee the transmission reliability.

Figure 15:
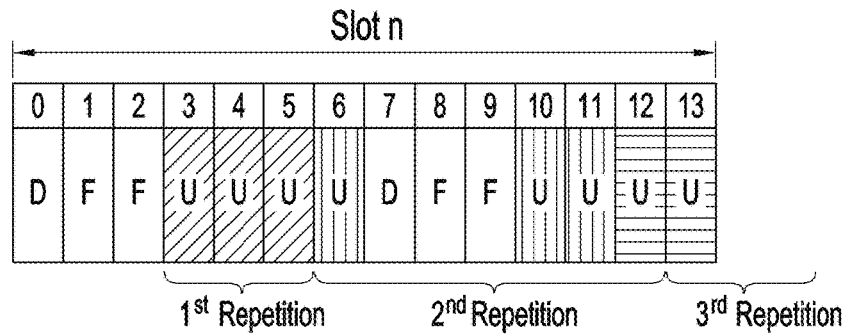
FIG. 15 illustratively shows a schematic diagram of resource mapping of a TDD system according to an embodiment of the present disclosure.

Method Three, in which the mapping may only be performed on the uplink symbol (U), and if the downlink symbol (D) or flexible symbol (F) is reached, the uplink transmission is mapped to the next uplink symbol (U). As shown in FIG. 15, it is assumed that the UE is configured to transmit the first repetition on Symbols 3~5 of Slot n. In the following symbols, Symbols 7~9 are respectively configured as a downlink symbol (D) and flexible symbols (F). Therefore, the second repetition is transmitted on Uplink Symbols 6, 10 and 12.

Similarly, for Method One and Method Three, it may be considered as postponing an uplink transmission that reaches a downlink symbol (D) or postponing an uplink transmission that reaches a downlink symbol or a flexible symbol (F). Similarly, the uplink transmission that reaches the downlink symbol (D) or the uplink transmission that reaches the downlink symbol or flexible symbol (F) may be dropped. The advantages and disadvantages are similar with those of the dropping or postponing in units of mini-slots as described above. Here, the dropping or postponing is performed in units of symbols. In addition, in each of Method One and Method Three, there is a case where one repetition is segmented into two transport blocks due to the DL/UL transmission direction. Similarly to the case whether the slot boundary may be crossed, since the uplink transmission is not continuous, the phase continuity of the uplink transmission may not be guaranteed. Therefore, it is required to insert the pilots separately in two adjacent transport blocks for channel estimation, in order to assist in demodulation. Similarly, the above-mentioned resource mapping methods occurring when one repetition reaches the slot edge (for example, how to perform the rate matching, symbol mapping, etc., that is, "Resource Mapping Method For Which A Repetition Is Performed In A Unit Of A Mini-Slot" as described previously) each are applicable to the case where the number of consecutive symbols is less than the number of symbols required for one repetition due to the direction of the DL/UL. For example, Method A or Method B in Method One in "Resource Mapping Method For Which A Repetition Is Performed In A Unit Of A Mini-Slot" as described previously may be used for processing the content of the second transport block, and Method X may be used for processing the content of the first transport block. That is, it is possible to transmit only the content of the first transport block and drop the content of the second transport block. At this time, the next repetition starts on the first uplink symbol immediately after the downlink symbol (D) or the flexible symbol (F). At this time, the uplink symbols in one repetition are continuous, and the symbols that may be used for an uplink transmission may be occupied as much as possible for the uplink transmission, which shortens the transmission latency.

The configuration of the uplink symbol (U), the downlink symbol (D), and the flexible symbol (F) in the above example may be a semi-static configuration which is configured by the RRC, or may be a result from dynamic overwriting by the DCI. According to an embodiment of the present disclosure, different mappings of transmission are used for the slot formats obtained in different ways. For example, in a case where the flexible symbol/slot is dynamically overwritten by the DCI to indicate the slot format, the mapping method of the uplink transmission may include that, for example:

the uplink transmission may be mapped on the uplink or flexible symbol/slot configured by the RRC, but when the DCI overwrites the flexible symbol/slot to downlink symbol/slot, the entire repetition (the entire mini-slot) is postponed, or only the transmission of the overwritten symbol is postponed. That is, the mapping of the entire repetition on symbols containing the overwritten symbol is modified, or only the mapping on the overwritten symbols is modified; or the uplink transmission may only be mapped on the uplink or flexible symbol/slot configured by the RRC, and supports the non-contiguous transmission. The number of symbols configured by the base station is the actual number of symbols of the uplink transmission. Therefore, the duration of the actual uplink transmission may be longer than the length of the number of allocated symbols (because there may be downlink/flexible symbols/slots within).

Similarly, the above method is also applicable to the downlink transmission (such as PDSCH, PDCCH, a downlink channel or signal for a power saving design, a downlink reference signal, etc.), only with U and D being interchanged.

That is, according to an exemplary embodiment, the mapping of the downlink transmission is performed according to at least one of: mapping on the downlink symbol and the flexible symbol, and mapping the downlink transmission to the next downlink symbol or flexible symbol if an uplink symbol is reached; mapping a repetition of the downlink transmission to the consecutive downlink symbols only if the number of consecutive downlink symbols is greater than or equal to the number of symbols of the repetition of the downlink transmission; or mapping only on the downlink symbols, and mapping the downlink transmission to the next downlink symbol if an uplink symbol or flexible symbol is reached.

Time Domain Resource Allocation Method

In order to start transmission as early as possible, shorten the latency and satisfy the high reliability performance, the number of symbols in one uplink or downlink grant is not limited by the number of the remaining symbols in the slot, that is, S+L>14, where S is a start symbol index, L is the number of symbols in a grant. At this time, the first transmission crosses the slot boundary. In LTE and NR, a Start and Length Indication (SLIV) is calculated by the following method:

If(L−1)<=7

SLIV=14*(L−1)+S,

Otherwise

SLIV=14*(7−L+1)+(7−1−5)

where 0<L≤14−S.

In order to support the scenario of S+L>14, the SLIV calculation formula may be modified to:

SLIV=14*(L−1)+S.

The above formula is applicable to the scenarios of L<14 and L=14.

In order to keep the existing values of SLIV and its corresponding starting position S and the transmission symbol length L the same to reduce the hardware modification complexity, and in order to support the scenario of S+L>14, the existing SLIV mapping may be extended. That is to say, the calculation formula of S+L>14 is obtained by extending the formula, while the calculation formula of S+L<14 is kept unchanged. For example, the calculation formula of SLIV could be modified to:

If L+S<14, then if (L−1)≤7

SLIV=14*(L−1)+S,

Otherwise

SLIV=14*(7−L+1)+(7−1−S)

If L+S>14 if (L−1)≤7

SLIV=14*(14−L+1)+(14−1−S)

Otherwise

SLIV=14*(L−1)+S

Table 1 includes the values of SLIV corresponding to S, L calculated by the above formula, and the values of SLIV are values when S and L are assigned with different values. This method is an extension of the existing calculation method of SLIV, and will not affect the calculated value when L+S≤14 when the existing base station and UE are implemented, but only complement the calculated value when L+S >14. In practice, it can be implemented only by simple replacement.

In addition, if L>14 is supported, the above methods may be combined. Specifically:

If L<14, then

If L+S≤14, then if (L−1)≤7

SLIV=14*(L−1)+S,

Otherwise

SLIV=14*(7−L+1)+(7−1−S)

If L+S>14 if (L−1)≤7

SLIV=14*(14−L+1)+(14−1−S)

Otherwise

SLIV=14*(L−1)+S

If L>14, then

SLIV=14*(L−1)+S

TABLE 1

| | | S | | | | | | | | | | | | | |
|---|---|---|---|---|---|---|---|---|---|---|---|---|---|---|---|
| | | 0 | 1 | 2 | 3 | 4 | 5 | 16 | 7 | 18 | 9 | 10 | 11 | 12 | 13 |
| L | 1 | 0 | 1 | 2 | 3 | 4 | 5 | 6 | 7 | 8 | 9 | 10 | 11 | 12 | 13 |
| | 2 | 14 | 15 | 16 | 17 | 18 | 19 | 20 | 21 | 22 | 23 | 24 | 25 | 26 | 182 |
| | 3 | 28 | 29 | 30 | 31 | 32 | 33 | 34 | 35 | 36 | 37 | 38 | 39 | 169 | 168 |
| | 4 | 42 | 43 | 44 | 45 | 46 | 47 | 48 | 49 | 50 | 51 | 52 | 156 | 155 | 154 |
| | 5 | 56 | 57 | 58 | 59 | 60 | 61 | 62 | 63 | 64 | 65 | 143 | 142 | 141 | 140 |
| | 6 | 70 | 71 | 72 | 73 | 74 | 75 | 76 | 77 | 78 | 130 | 129 | 128 | 127 | 126 |
| | 7 | 84 | 85 | 86 | 87 | 88 | 89 | 90 | 91 | 117 | 116 | 115 | 114 | 113 | 112 |
| | 8 | 98 | 99 | 100 | 101 | 102 | 103 | 104 | 105 | 106 | 107 | 108 | 109 | 110 | 111 |
| | 9 | 97 | 96 | 95 | 94 | 93 | 92 | 118 | 119 | 120 | 121 | 122 | 123 | 124 | 125 |
| | 10 | 83 | 82 | 81 | 80 | 79 | 131 | 132 | 133 | 134 | 135 | 136 | 137 | 138 | 139 |
| | 11 | 69 | 68 | 67 | 66 | 144 | 145 | 146 | 147 | 148 | 149 | 150 | 151 | 152 | 153 |
| | 12 | 55 | 54 | 53 | 157 | 158 | 159 | 160 | 161 | 162 | 163 | 164 | 165 | 166 | 167 |
| | 13 | 41 | 40 | 170 | 171 | 172 | 173 | 174 | 175 | 176 | 177 | 178 | 179 | 180 | 181 |
| | 14 | 27 | 183 | 184 | 185 | 186 | 187 | 188 | 189 | 190 | 191 | 192 | 193 | 194 | 195 |

In order to achieve the required reliability or to compensate for coverage, the actual transmission time as required may span a plurality of slots. At this time, there may be many ways of allocating the time domain resources as follows.

Method 1: respectively indicating the position of the slot, the start symbol position S in the slot, the length L (0≤L<14) of one repetition (transmission), and the number of repetitions k≥1.

Method 2: respectively indicating the position of the slot, the start symbol position S in the slot, the length L (0≤L<Z) of one repetition (transmission), where Z>14, and the number of repetitions k≥1.

Method 3: respectively indicating the position of the slot, the start symbol position S in the slot, the length L (0≤L<Z) of all repetition(s) (transmission(s)), where Z>14. At this time, Z includes the total number of symbols of all the transmissions, so there is no need to configure the number of repetitions k, that is, k=0.

In methods 2 and 3 above, the length L of one repetition (transmission) may actually across slot boundaries and/or symbols that cannot be used for transmission, and in this case it may be segmented into multiple repetitions (transmissions). At this time, the length L actually indicates the length of the time domain resource allocation, not the actual number of symbols transmitted by one transmission.

The above three methods may achieve the same or similar purposes by adjusting different parameter configurations. In NR, a list of 16 states is configured through the RRC message, and each row in the list includes the location indicator K2 of slot, as well as the start symbol and the length of the transmission (SLIV). The DCI further indicates one line on list which is configured in the RRC. Similarly, the above method may configure a list through RRC and further indicate through DCI. The repetition number k may be indicated by different fields through DCI or by the same or different fields in RRC. Specifically, as K2, the repetition number k may be indicated in the TDRA table along with the SLIV by a state or entry of the TDRA. The configurations of the various methods and the corresponding time domain mapping manners are specifically described below.

Figure 16:
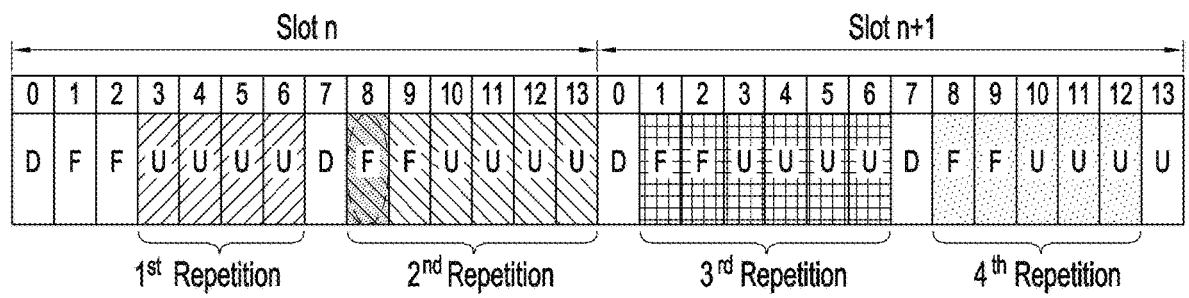
FIG. 16 illustratively shows a schematic diagram of a time domain resource allocation method according to an embodiment of the present disclosure.

FIG. 16 is a schematic diagram of a time domain resource allocation. For Method 1, it is indicated by K2 that its starting slot is Slot n, S=3, L=12, k=2. Then, according to the resource mapping method as described above, it may be obtained that the first repetition occupies Symbol 3 in Slot n to Symbol 0 in Slot (n+1). In order to shorten the transmission latency, the second repetition starts immediately after the first repetition, that is, the second repetition occupies Symbols 1~12 in Slot (n+1). Due to the influence of the DL/UL transmission direction, the DL symbol is not transmitted and is dropped, and due to the DL/UL transmission direction, each repetition is segmented into 2 transport blocks.

The above method uses the method of dropping a DL symbol when the DL symbol is reached, and may also use the postponing method. Then, the first repetition will be segmented into three transport blocks, the second transport block occupies Symbol 8~13, and the third transport block occupies Symbols 1~2 in Slot (n+1), for a total of 12 symbols. So does the second repetition.

In addition, in order to achieve the similar purpose, Method 1 may be used to configure S=3, L=6, k=4. At this time, the first repetition occupies Symbol 3~8 of Slot n (Symbol 7 is dropped), the second repetition occupies Symbol 9 of Slot n to Symbol 0 of Slot (n+1) (Symbol 0 is dropped), and so do the third and fourth repetitions. At this time, compared to the previous method, the first repetition is segmented into two transport blocks due to the DL/UL transmission direction, and the second transport block has only one symbol. If it is defined that no transmission is performed if a transport block has one symbol, the transmission of the second transport block will be advanced, and the final actual transmission will be one symbol less than the configuration of L=12, k=2. Alternatively, the DMRS may be shared with the second repetition.

The transmission pattern as shown in FIG. 16 may also be configured by Method 2 or Method 3, that is, S=3, L=24. For Method 2, k=1. There is no need to configure the value of k for Method 3. At this time, 24 symbols are segmented into 4 transport blocks due to the DL/UL transmission direction or the slot boundary. Similarly, the postponing method may also be used, where L=21.

Figure 17:
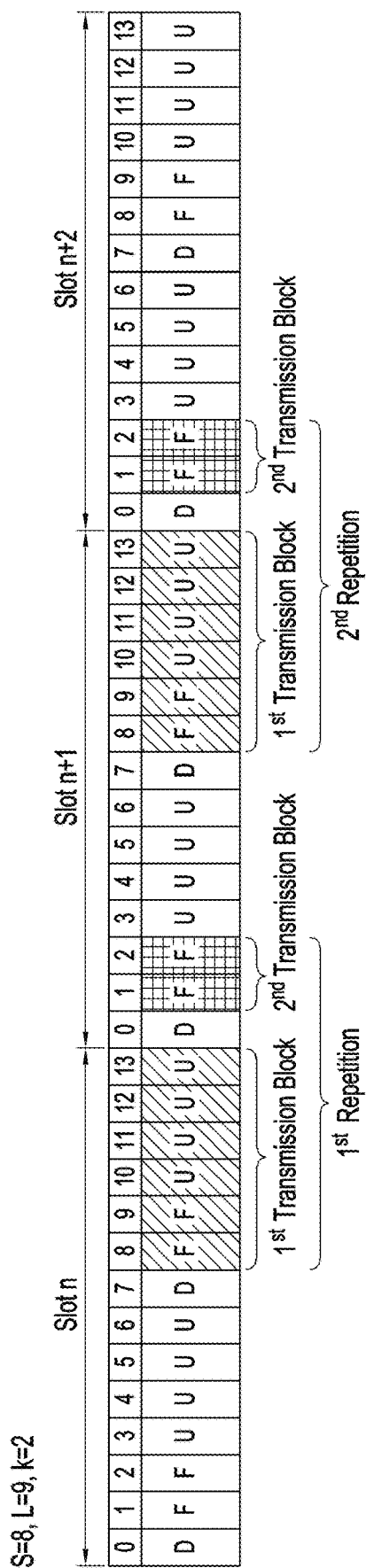
FIG. 17 illustratively shows a schematic diagram of a time domain resource allocation method according to an embodiment of the present disclosure.

FIG. 17 is a schematic diagram of another resource mapping corresponding to a time domain resource allocation method. As shown in FIG. 17, the repetition at this time is performed in units of slots. That is, the respective repetitions start from the symbols having the same relative positions in respective slots. In FIG. 17, S=8, L=9, and k=2. The first repetition occupies Symbol 8 of Slot n to Symbol 2 of Slot (n+1), and is segmented into 2 transport blocks, Symbol 0 of Slot (n+1) being dropped. The second repetition also occupies Symbol 8 of Slot (n+1) to Symbol 2 of Slot (n+2). At this time, the two repetitions are not continuous, and have a transmission latency longer than that of the repetitions in units of mini-slots. If the repetition in units of mini-slots is not supported, but only the repetition in units of slots is supported, that is, L=14, then as in the example given in FIG. 17, if S=8, L=14, k=2, it will occupy all symbols from Symbol 8 of Slot n to Symbol 2 of Slot (n+2) (the DL symbols being removed). It may be specified in the protocol or configured by the base station that whether only the repetition of L=14 is supported.

For Method 2 for time domain resource allocation as described above, it may be limited that Z=28, that is, 2 slots, then the repetition in a unit of 2 slots may be supported, and the start position of the second repetition is at the same symbol of Slot (n+2). If it is limited that S+L<Z, the calculation of SLIV is modified to:

If $(L-1) \leq Z/2$
$SLIV = Z*(L-1)+S$,
Otherwise
$SLIV = Z*(Z-L+1)+(Z-1-S)$

Transport Block Size (TBS) Determination Method

For Method 1 as described in "Time Domain Resource Allocation Method", the number of available resource elements (REs) may be determined first, and at this time, one repetition may cross one slot. The available resource elements may be determined based on the number of symbols L in the time domain resource allocation. Specifically:

The UE determines the number $N_{RE} = N_{sc}^{RB} \cdot N_{symb}^{sh} - N_{DMRS}^{PRB} - N_{oh}^{PRB}$ of REs in one PRB allocated to PUSCH or PDSCH, where $N_{sc}^{RB}=12$ is the number of frequency domain subcarriers of one PRB, $N_{symb}^{sh}$ is the number (i.e., L) of symbols occupied by one transmission (repetition) indicated in the time domain resource allocation, $N_{DMRS}^{PRB}$ is the number of DMRSs occupied in each PRB, and $N_{oh}^{PRB}$ is an overhead configured for the higher level. The overhead is 0 for MSG3 transmission.

The UE determines a total number $N_{RE}=\min(156, N_{RE}) \cdot n_{PRB}$ of allocated REs, where $n_{PRB}$ is the total number of PRBs allocated to the UE.

Since the MCS in the existing communication system (such as LTE or NR) is designed to occupy at most 14 symbols in one slot/subframe for one transport block, if it is necessary to further reduce the code rate, the repetition needs to be configured. In Method 2 or Method 3 as described in "Time Domain Resource Allocation Method", the number of all symbols occupied and/or number of symbols L indicated in the time domain resource allocation>14, then the number of available resource elements may be calculated by at least one of the following methods, so as to derive the TBS:

Method m: Calculating the number of available REs according to a fixed value. For example, the fixed value is the number of symbols in one slot, i.e., $N_{symb}^{sh}=14$, which is used to calculate the number of available REs. This fixed value may be configured by the RRC and/or DCI, or is predefined in the protocol. For example, a new field is introduced in the DCI to indicate the number of reference symbols, or an item is added to some parameters configured by the RRC.

Method n: Determining the number of available REs according to the number of all symbols occupied and/or the number L of symbols indicated in the time domain resource allocation and an adjustment coefficient α, wherein the adjustment coefficient α may be configured by the base station (for example, by the DCI, RRC, or the MAC layer) or predefined in the protocol. For example, a new field is introduced in the DCI to indicate the number of reference symbols, or an item is added to some parameters configured by the RRC. Specifically, the number of available REs is calculated according to $N_{symb}^{sh}=[L/\alpha]$ (which may be defined as upper rounding). Alternatively, the adjustment coefficient $\alpha$ is calculated according to a predefined rule, such as $\alpha=[L/14]$, (which may also be defined as upper rounding). Alternatively, $\alpha$ is the number of transport blocks (repetitions/transmissions) in the actual transmission. Since the slot edge may be reached, it may be guaranteed that $N_{symb}^{sh} \le 14$ which is used for calculating the number of REs.

Method p: Determining the number of available REs according to the number $L_{min}$ of symbols in the transport block having the smallest number of symbols among the segmented plurality of transport blocks (repetitions/transmissions). That is, $L_{min}=\min(L_0, \ldots L_{k-1})$, where $L_0, \ldots L_{k-1}$ are the numbers of symbols of the 0-th to (k−1)-th transport blocks (repetitions/transmissions). This method may ensure that even the transport block with the smallest number of symbols may not lead to a much higher actual transmission code rate. The base station may be given more opportunities to decode in advance.

Method q: Determining the number of available REs according to the number of symbols in the first transport block of all transport blocks. This method is the simplest for scheduling of the base station because only the number of symbols in the first resource block needs to be calculated, and it is easy to derive the number of all the required symbols based on the number of symbols.

Method s: Determining the number of available REs according to the symbol length L in the time domain resource indication. Since the UE determines the total number of allocated REs $N_{RE}=\min(156, N_{RE}) \cdot n_{PRB}$, (wherein, $n_{PRB}$ is the total number of PRBs allocated to the UE) when the number of REs is determined, the actual number of $N_{RE}$ does not exceed $156 \cdot n_{PRB}$ even if the L for determining the number of REs is greater than 14.

Method j: Determining the number of available REs according to the number $L_{max}$ of symbols in the transport block having the largest number of symbols among the segmented plurality of transport blocks (repetitions/transmissions). That is, $L_{max}=\max(L_0, \ldots L_{k-1})$, where $L_0, \ldots L_{k-1}$ are the numbers of symbols of the 0-th to (k−1)-th transport blocks (repetitions/transmissions). This method may make use of the coding gain more effectively.

Method k: Determining the number of available REs according to the first transport block and the second transport block among the segmented plurality of transport blocks (repetitions/transmissions). Specifically, the number of available REs is determined according to one of the following operation results of the two transport blocks: taking the average value, taking the sum, taking the maximum value, and taking the minimum value. This method may be used only in the case where one transmission spans slot boundaries.

The above methods may be equally applicable to the case where the number of symbols $L \le 14$ or to only the case where $L>14$, and when $L \le 14$, the number of available resource elements is determined according to the number L of symbols. Alternatively, the base station configures one of them.

Furthermore, in order to obtain a similar effect, the code rate R in the existing MCS table may be changed, while $N_{symb}^{sh}=L$ is kept. Specifically, if the number of all symbols occupied and/or the number of symbols L in the time domain resource allocation>14, the code rate R in the MCS table is adjusted to $R'=R/\alpha$, where $\alpha$ is the adjustment coefficient, which may be configured by the base station (for example, by the DCI, RRC, or the MAC layer). Alternatively, it is calculated based on other parameters, such as $\alpha=[L/14]$ (which may also be defined as upper rounding), or $\alpha$ is the number of transport blocks segmented in the actual transmission.

Alternatively, if the number of all symbols occupied and/or the number of symbols L in the time domain resource allocation>14, a new MCS table may be used to calculate different code rates R. For example, a code rate smaller than the code rate R corresponding to $L \le 14$ is used to provide higher reliability or better coverage. Alternatively, if $L>14$ is supported, a new MCS table with a lower code rate is created.

The above methods may be applied to a variety of resource allocation methods, such as: configuring the time domain resources of one repetition (transmission) and the times of repetition; configuring the time domain resources of all transmissions; respectively configuring the time domain resources (SLIV) of each transmission and so on.

Frequency Hopping Method

In NR, two methods of frequency hopping in frequency domain are defined:

Inter-slot frequency hopping

Intra-slot frequency hopping

Figure 18:
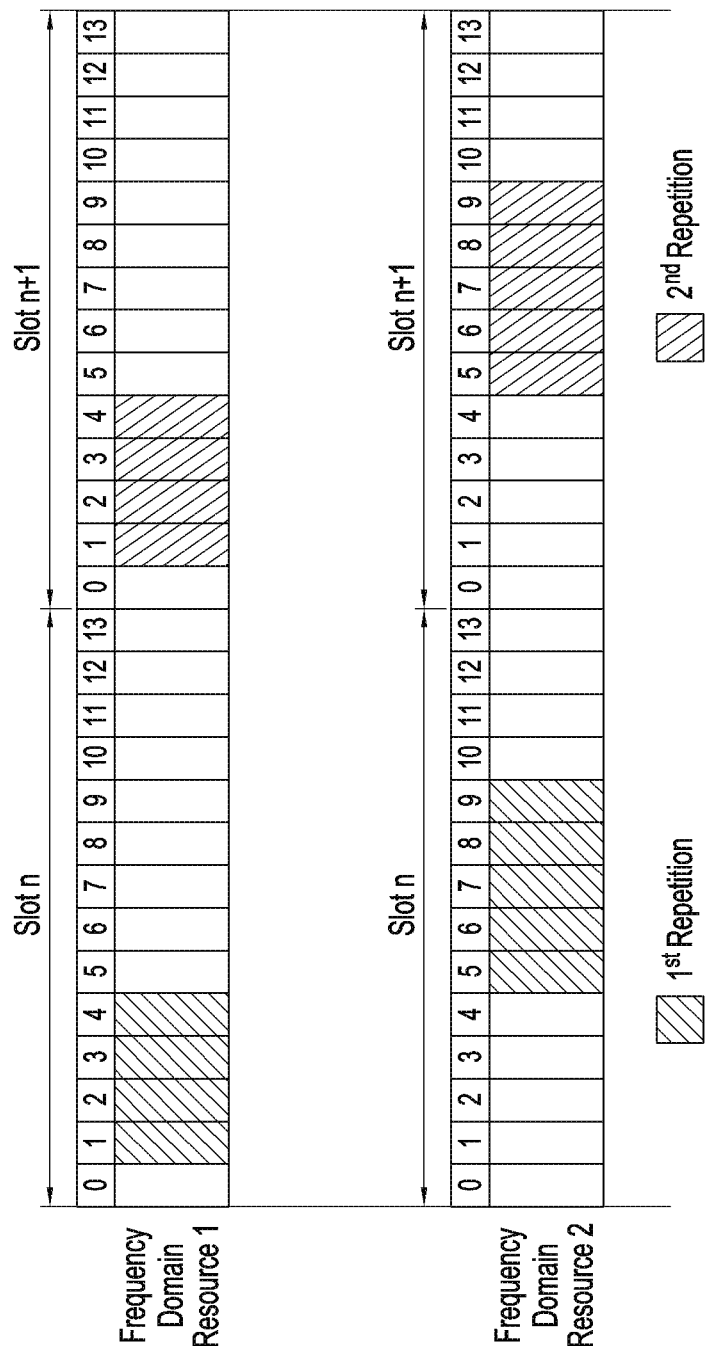
FIG. 18 illustratively shows a schematic diagram of a frequency hopping method according to an embodiment of the present disclosure.

When the repetition is performed in units of mini-slots, only one transmission is supported in one slot in NR. For intra-slot frequency hopping that only one transmission is supported in a slot, when the repetition is configured, in each slot, the number of symbols of the first (Y−1) hops is $\lfloor N_{symb}^{PUSCH,s}/Y \rfloor$, and the number of symbols of the last hop is $N_{symb}^{PUSCH,s} - \lfloor N_{symb}^{PUSCH,s}/Y \rfloor *(Y-1)$, where $N_{symb}^{PUSCH,s}$ is the length of the OFDM symbol of the PUSCH transmission in one slot, and Y is the number of times of frequency hops. Preferably, the number of frequency hops is two. In an example, the uplink transmission resources allocated by the base station to the UE are Symbols 1~9 in Slot n, that is, the mini-slot contains 9 symbols, the number of repetitions is 2, the frequency hopping mode is the intra-slot frequency hopping, the frequency domain positions used for frequency hopping are frequency domain resource 1 and frequency domain resource 2. Then, as shown in FIG. 18, the UE transmits the first hop of the first repetition on the frequency domain resource 1 of Symbol 1~4 ([9/2]=4) of Slot n, transmits the second hop of the first repetition on the frequency domain resource 2 of Symbol 5~9 (9−[9/2]=5) of Slot n, transmits the first hop of the second repetition on the frequency domain resource 1 of Symbol 1~4 of Slot (n+1), and transmits the second hop of the second repetition on the frequency domain resource 2 of Symbol 5~9 of Slot (n+1).

In the case of configuring the uplink transmission resources in units of mini-slots and a plurality of transmissions (repetitions) being performed in one slot is supported (i.e., repeating in units of mini-slots), how to support frequency hopping is also a problem needed to be solved.

A method of frequency hopping for the transmission in the case of the repetition being performed in units of mini-slots is given below. This may be referred to as inter-slot or intra-slot or mini-slot-based frequency hopping. Hereinafter, the uplink transmission is taken as an example for illustration.

Method One, in which the frequency hopping is performed in a unit of each repetition of the uplink transmission.

Figure 19:
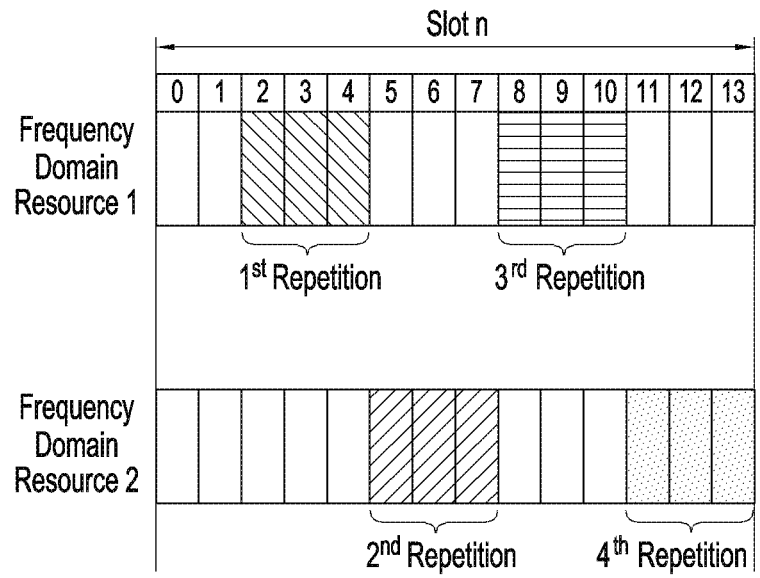
FIG. 19 illustratively shows a schematic diagram of a frequency hopping method according to an embodiment of the present disclosure.

In an example, the uplink transmission resources allocated by the base station to the UE is Symbol 2~4 in Slot n, that is, each repetition includes 3 symbols, the number of repetitions is 4, and the frequency domain positions used for frequency hopping are the frequency domain resource 1 and the frequency domain resource 2. As shown in FIG. 19, the UE transmits the first repetition on the frequency domain resource 1 of Symbols 2~4 of Slot n, transmits the second repetition on the frequency domain resource 2 of Symbols 5~7 of Slot n, transmits the third repetition on the frequency domain resource 1 of Symbols 8~10 of Slot n, and transmits the fourth repetition on the frequency domain resource 2 of Symbols 11~13 of Sot n.

Method Two, in which a predetermined number of repetitions are transmitted on respective predetermined hops. For example, the first hop transmits mini-slots whose number is the number of repetitions/2 or the total number of symbols of all the repetitions/2, and the second hop transmits the remaining repetitions or symbols.

Figure 20:
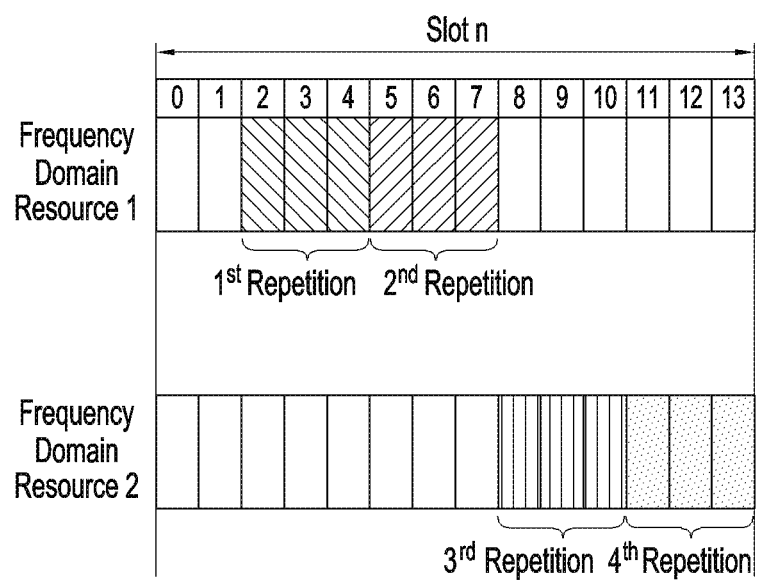
FIG. 20 illustratively shows a schematic diagram of a frequency hopping method according to an embodiment of the present disclosure.

In an example, the uplink transmission resources allocated by the base station to the UE are Symbol 2~4 in Slot n, that is, each repetition includes 3 symbols, the number of repetitions is 4, and the frequency domain positions used for frequency hopping is the frequency domain resource 1 and the frequency domain resource 2. As shown in FIG. 20, the UE transmits the first repetition on the frequency domain resource 1 of Symbols 2~4 of Slot n, transmits the second repetition on the frequency domain resource 1 of Symbols 5~7 of Slot n, transmits the third repetition on the frequency domain resource 2 of Symbols 8~10 of Slot n, and transmits the fourth repetition on the frequency domain resource 2 of Symbols 11~13 of Slot n.

Method Three, in which a predetermined number of symbols for each repetition are transmitted on respective predetermined hops. For example, an odd hop transmits Floor (the number of symbols/2) of each repetition, and an even hop transmits the remaining symbols of each repetition.

Figure 21A:
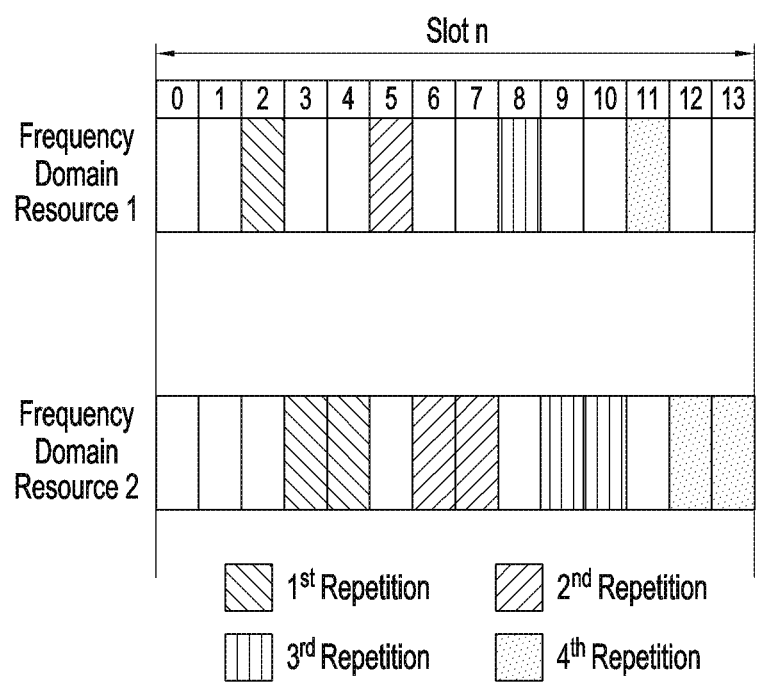
FIG. 21a illustratively shows a schematic diagram of a frequency hopping method according to an embodiment of the present disclosure.
Figure 21B:
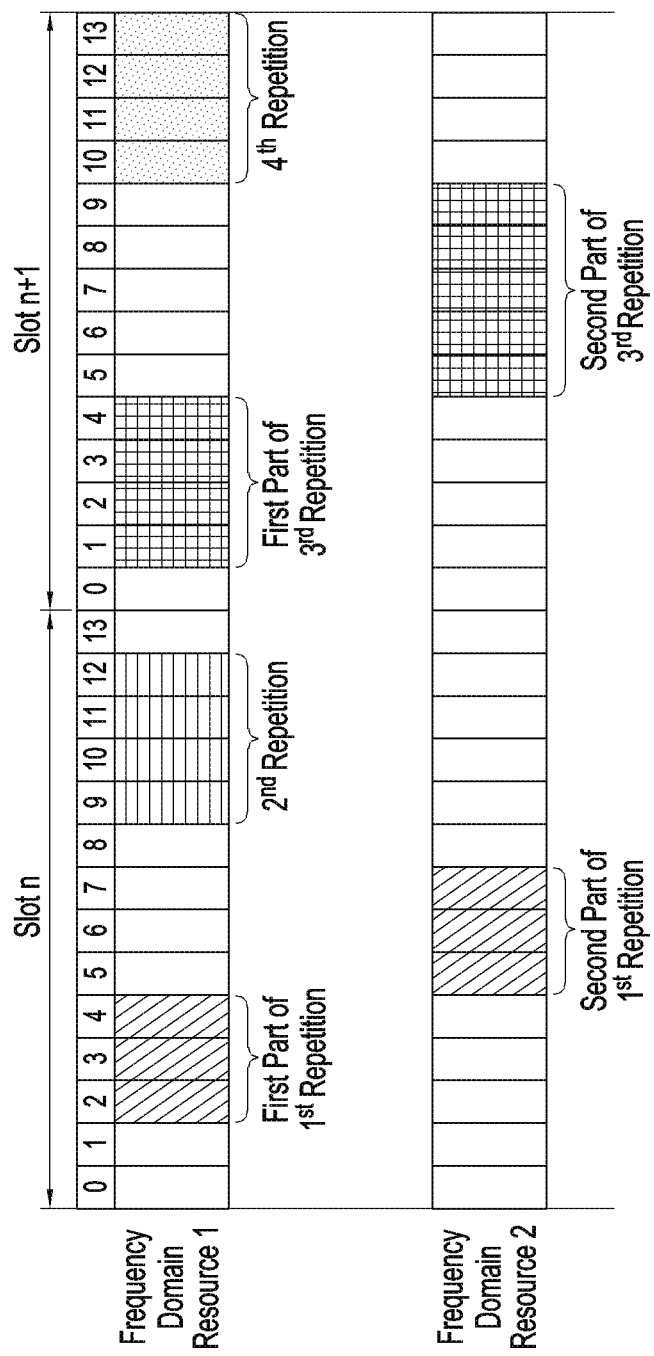
FIG. 21b illustratively shows a schematic diagram of a frequency hopping method according to an embodiment of the present disclosure.

Furthermore, in repetitions performed in units of mini-slots, the number of symbols actually transmitted in each repetition may be different. In this case, in order to further balance the number of symbols in each hop, the method that a predetermined number of symbols for each repetition are transmitted on respective predetermined hops may be further expanded to further determine whether to perform intra-mini-slot frequency hopping according to the threshold of the number of symbols actually transmitted in each repetition. This threshold may be pre-defined in the protocol or configured by the base station. Specifically, as shown in FIG. 21b, a total of four repetitions are arranged in one transmission, starting from symbol 2 of slot n. Among them, the numbers of symbols in the four repetitions are 6 symbols, 4 symbols, 9 symbols, and 4 symbols, respectively. The threshold of the symbol length is 5, that is, if the number of symbols is greater than 5, the intra-mini-slot frequency hopping is performed, otherwise, the inter-mini-slot frequency hopping is performed. Thus, the intra-mini-slot frequency hopping is performed for the first repetition and the third repetition, and the inter-mini-slot frequency hopping is performed for the second repetition and the fourth repetition.

In this method, the start PRB position of each hop may be defined by the following formula:

$$RB_{start} = \begin{cases} RB_{start} & i = 0 \\ (RB_{start} + RB_{offset}) \bmod N_{BWP}^{size} & i = 1 \end{cases}$$

Where i=0 and i=1 represent the first hop and the second hop respectively, $RB_{start}$ is the starting RB position in the UL BWP, $RB_{offset}$ is the frequency domain offset size between the two hops, and $N_{BWP}^{size}$ is the number of RBs in the BWP.

For the hybrid frequency hopping method, when the number $L_j$ of symbols in each repetition is greater than or no less than the threshold $L_{FH}$ (that is, $L_j > L_{FH}$, where j=0, . . . , K−1, K is the repetition number), the number of symbols in the first hop is defined as $[L_j/2]$, and the number of symbols in the second hop is defined as $L_j-[L_j/2]$. If the number $L_j$ of symbols in each repetition is less than or no greater than the threshold $L_{FH}$ (that is, $L_j < L_{FH}$), the number of symbols in the hop is $L_j$, and the hop is defined as the first hop. As shown in FIG. 21b, each of the first repetition and the third repetition is divided into two hops, respectively occupying the frequency domain resource 1 and the frequency domain resource 2, and each of the second repetition and the fourth repetition is one hop, which is defined as the first hop, occupying frequency domain resources 1. This leads to more resources occupied in frequency domain resource 1 than in frequency domain resource 2.

In order to improve the situation of uneven resource occupation, in another example, the frequency domain resource position may be determined for repetitions divided into two hops and repetitions that are not divided into two hops, respectively. Specifically, if one repetition is divided into two hops, the two hops are defined as the first hop and the second hop, respectively. On the other hand, if one repetition is only 1 hop, it will be arranged according to how many repetitions with their number of symbols less than the predetermined number have occurred. For example, in the example of FIG. 21b, the second repetition is defined as the first hop, and the fourth repetition is defined as the second hop, that is, transmitted on the frequency domain resource 2.

In another embodiment, the sequence number of each hop may be uniformly defined, and the position of the starting RB in the time domain may be determined according to the sequence number:

$$RB_{Start}(i) = \begin{cases} RB_{Start}, & i \bmod 2 = 0 \\ (RB_{Start} + RB_{offset}) \bmod N_{RWP}^{size}, & i \bmod 1 = 1 \end{cases}$$

Where i is the serial number of each hop defined uniformly. Specifically, when the number $L_j$ of symbols in a repetition is greater than or no less than the threshold $L_{FH}$ the repetition is defined as two hops, otherwise the repetition is defined as one hop, and the repetitions are uniformly numbered from the first repetition. Thus, for the configuration in FIG. 21b, the first part of the third repetition should be transmitted in the frequency domain resource 2, and the second part of the third repetition is transmitted in the frequency domain resource 1. Sequentially, the 4th repetition is transmitted in the frequency domain resource 2. In addition, this method may be easily extended to the case of N hops, and the position of the frequency domain resource of a hop may be determined according to the result of "the unified number" MOD "hop number N".

In an example, the uplink transmission resources allocated by the base station to the UE are Symbol 2~4 in Slot n, that is, each repetition includes 3 symbols, the number of repetitions is 4, and the frequency domain positions used for frequency hopping is the frequency domain resource 1 and the frequency domain resource 2. Then, as shown in FIG. 21a, the UE transmits the first repetition on Symbols 2~4 of Slot n. Specifically, the first symbol of the first repetition is transmitted on the frequency domain resource 1 of Symbol 2, and the second and the third symbols of the first repetition are transmitted on the frequency domain resource 2 of Symbols 3~4. The UE transmits the second repetition on Symbols 5~7 of Slot n. Specifically, the first symbol of the second repetition is transmitted on the frequency domain resource 1 of Symbol 5, and the second and the third symbols of the second repetition are transmitted on the frequency domain resource 2 of Symbol 6~7. The UE transmits the third repetition on Symbol 8~10 of Slot n. Specifically, the first symbol of the third repetition is transmitted on the frequency domain resource 1 of Symbol 8, and the second and the third symbols of the third repetition are transmitted on the frequency domain resource 2 of Symbol 9~10. The UE transmits the fourth repetition on Symbols 11~13 of Slot n. Specifically, the first symbol of the fourth repetition is transmitted on the frequency domain resource 1 of Symbol 11, and the second and the third symbols of the fourth repetition are transmitted on the frequency domain resource 2 of Symbols 12~13.

The above methods may occur in one slot, and may be referred to as intra-slot frequency hopping. If the repetition crosses a plurality of slots, the frequency hopping may also be performed using the methods as described above, which may be referred to as inter-slot frequency hopping. The UE may perform one of the above frequency hopping methods as configured by the base station (e.g., by the RRC).

The above frequency hopping methods are also applicable to frequency hopping of downlink transmission.

Transmission Started From Arbitrary Symbol

In NR, if the base station configures configuration information of an uplink transmission to the UE, the UE may start the uplink transmission at any transmission occasion with the RV being 0, thereby reducing the latency. That is, the UE determines, according to time-frequency resource information and/or information of the number of repetitions in the configuration information for the uplink transmission, that the transmission occasions where the start positions of the resources available for the uplink transmission are located are an entire set of the start positions of the respective repetitions or a subset of the start positions of the respective repetitions (e.g., a subset of the start positions of RV=0). When the uplink data arrive, the latest transmission occasion in the entire set of the start positions of the respective repetitions or the subset of the start positions of the respective repetitions is determined as the transmission occasion for the uplink data.

However, in order to meet a strict requirement on the low latency, such as an end-to-end transmission on the order of 0.5 ms~1 ms, according to an embodiment of the present disclosure, the latency of the UE waiting for the transmission occasion may be reduced by configuring the number of one or more symbols contained in one transmission period to be less than the number of symbols required for the K repetitions.

According to an embodiment of the present disclosure, the base station may configure the transmission period to include one or more symbols. According to another embodiment of the present disclosure, the base station may also configure the transmission period to be an absolute length of time. The length of time corresponding to the transmission period is less than the length of time required for the number of repetitions configured for the uplink transmission. According to an embodiment of the present disclosure, the UE determines, according to the transmission period duration and/or the time domain offset information in the configuration information for the uplink transmission, that the transmission occasion where the start position of the resources available for the uplink transmission is the start position of each transmission period. When the uplink data arrive, the UE may determine the latest start position in the start positions of the respective transmission periods as the transmission occasion of the uplink data.

Figure 22:
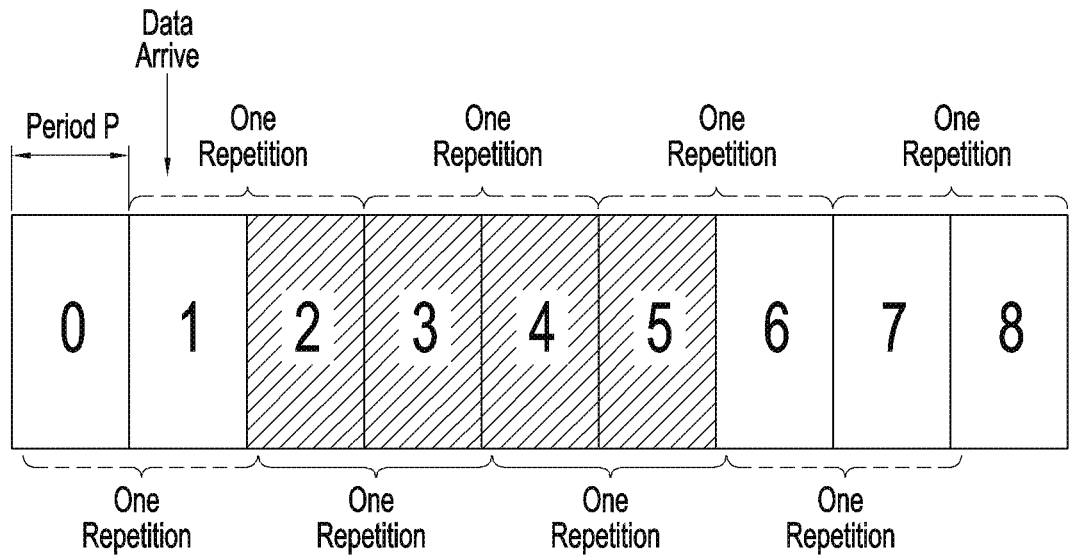
FIG. 22 illustratively shows a schematic diagram of resource mapping of an uplink data transmission according to an embodiment of the present disclosure.

In order to reduce the latency, the base station may configure the UE with a transmission period which is shorter than a transmission duration required for one repetition. For example, the length of time required for one repetition may include a plurality of sub-resources. Specifically, for example, several symbols may be included in one mini-slot or slot. As shown in FIG. 22, the transmission period P is one sub-resource, and the repetitions which are performed K=2 times occupy 4 sub-resources, each repetition occupying 2 sub-resources. In this configuration, the transmission may be started at any sub-resource regardless of whether an all-zero RV is configured.

Specifically, as shown in FIG. 22, the time-frequency resources defined by the configured uplink grant which is configured by the base station include two OFDM symbols, the number of repetitions K=2, and the transmission period P is the length of one OFDM symbol. The data of the UE arrive at Symbol 1 (i.e., the uplink transmission may be performed at the next transmission occasion available for transmission). Since the transmission period P is one OFDM symbol, the next occasion available for transmission is Symbol 2. Since one transmission (repetition) occupies one uplink grant, that is, 2 OFDM symbols, and the number of repetitions K=2, the UE performs the first repetition at Symbol 2 and Symbol 3, and performs the second repetition at Symbol 4 and Symbol 5. Since the UE may start the uplink transmission from any sub-resource, the base station needs to perform blind detection on all possibilities. As shown in FIG. 20, the base station assumes that the UE performs K=2 repetitions on Symbols 0~3, or performs K=2 repetitions on Symbols 1~4, or performs K=2 repetitions on Symbols 2~5, and so on. In this way, the base station needs to perform blind detection on all of these possibilities. The repetitions actually transmitted by the UE are shown in solid line brackets in FIG. 22, while the dashed brackets show the repetitions that may occur as considered by the base station.

When each transmission starts, the UE may select an antenna port according to a predefined rule and transmit a corresponding DMRS for data demodulation and detection of the base station. The time domain symbol position of the DMRS determined by the UE may be predefined or configured by the base station. The time domain symbol position of the DMRS is the $1_0$-th symbol starting from a reference point 1, wherein the reference point 1 may be defined as a start symbol of the slot, or a start symbol of the PUSCH resource position scheduled/allocated by the base station, or the first symbol of each frequency hopping when the frequency hopping is supported. $1_0$ may be configured by the base station (e.g. configured by the RRC) or $1_0$=0, or predefined in the protocol. As shown in FIG. 20, the UE determines that the first symbol of each repetition is the time domain symbol position of the pilot signal, Symbol 2 is the time domain symbol position of the pilot signal in the first repetition, and Symbol 4 is the time domain symbol position of the pilot signal in the second repetition. Alternatively, it may be predefined that from the first symbol, one DMRS is inserted every several symbols. Then, the time domain symbol position of the DMRS does not change with the change of the start position of the uplink transmission. Therefore, it is required that in all the M symbols occupied by K repetitions, the density of the pilot is at least less than or equal to the number M of all symbols. This ensures that there is at least one DMRS for data demodulation no matter where the UE starts transmitting the uplink data. Alternatively, all the symbols occupied by the K' repetitions may be bound into one scheduling, and the density of the DMRS and the time domain position and the frequency domain position of the DMRS are derived according to the existing configuration of the DMRS of the NR and the predefined rule. Preferably, K' is less than or equal to K, which may be configured by the base station or calculated by the UE.

According to another embodiment of the present disclosure, the transmission occasion where the start position of the resources available to the uplink transmission is located may be configured as any sub-resource including one or more symbols, thereby allowing the UE to start transmission from any one of the sub-resources. That is, when the uplink data arrive, the latest sub-resource is determined as the transmission occasion of the uplink data, thereby further reducing the latency of the uplink transmission. The sub-resource is the smallest divisible time unit, for example, one OFDM symbol or a group of OFDM symbols, and the sub-resource may be configured by the base station or predefined in the standard. For example, such a transmission occasion may be configured by RRC signaling. The RRC signaling may be included in the configuration information for an uplink transmission transmitted by the base station to the UE. In the present disclosure, the signaling is referred to as initial resource information.

In particular, in the above example, K=1, i.e., only one repetition is supported, i.e., the base station schedules one TB. However, it may be allowed to start the uplink transmission on any sub-resource (e.g., one or more symbols, which may be predefined or configured by the base station). At this time, it is equivalent to configuring the transmission period P to be equal to one sub-resource, and of course, it is not necessary to configure the transmission period P. Specifically, the UE determines that the uplink transmission may be started in any sub-resource as configured by the base station (for example, the initial resource information), and the UE obtains the uplink scheduling according to the DCI or the RRC, starts uplink transmission on the latest sub-resource when the uplink data arrive, and repeats the transmission K times. The sub-resource is configured in the uplink scheduling and/or configured in the initial resource information.

Figure 23:
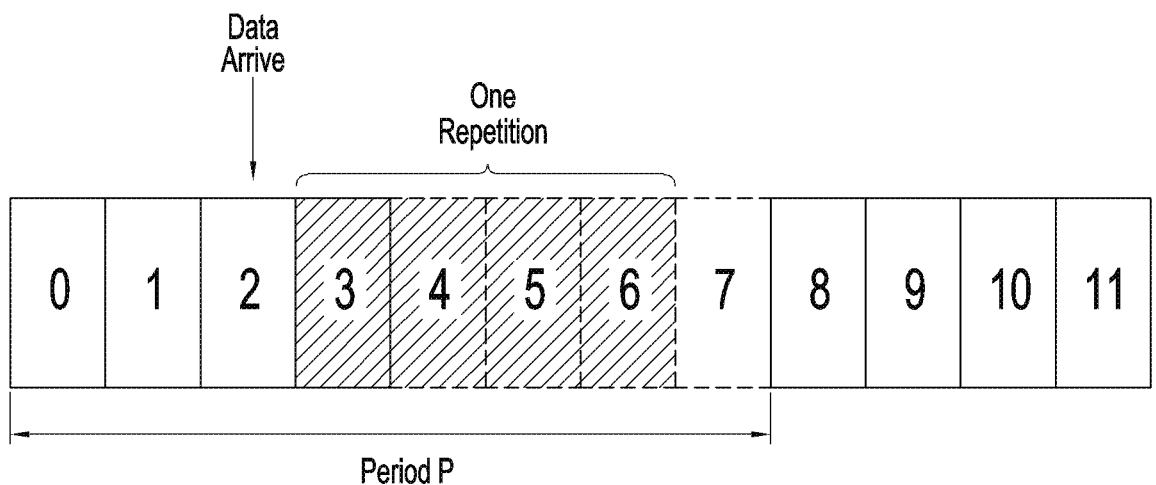
FIG. 23 illustratively shows a schematic diagram of resource mapping of uplink data transmission according to an embodiment of the present disclosure.

As shown in FIG. 23, the base station is configured with K=1 repetition, the transmission period is P=8 sub-resources, and the time-frequency resources configured by the uplink grant are four sub-resources starting from Sub-resource 0 as indicated by solid lines, and the sub-resource that is not configured by the uplink grant in one transmission period is indicated by dashed lines. At this time, if the possible transmission occasion is the start position of the sub-resource configured by the uplink grant, the transmission occasion that the UE can start the uplink transmission is Sub-resource 0, or Sub-resource 8 of the next transmission period, and so on. According to an embodiment of the present disclosure, the uplink transmission is allowed to start at any sub-resource. Preferably, one sub-resource is one OFDM symbol. As shown in FIG. 23, the data arrive at Sub-resource 2, and the first available sub-resource is Sub-resource 3. Then, the UE performs K=1 transmission from Sub-resource 3, and occupies 4 sub-resources according to the uplink grant, that is, the Sub-resources 3~6. The DMRS is transmitted on Sub-resource 3. The foregoing sub-resources may be contiguous or non-contiguous, and the UE may derive the available sub-resources according to the method in "Resource Mapping Method of TDD System" as described previously. In particular, the transmission period P may be equal to the number of sub-resources in the uplink grant, and the UE may start a continuous transmission at any sub-resource. And the K transmissions (repetitions) may cross the boundary of the transmission period and occupy the sub-resources of the next transmission period. If a plurality of HARQ processes are supported, the HARQ process ID may be determined according to one of the foregoing methods in "Determination of HARQ Process ID".

In another example, if the length of time corresponding to the transmission period P is greater than the length of time required for K repetitions, it may be specified that the UE starts the uplink transmission only on any resource or any sub-resource occupied by K repetitions started from each transmission period; or that the UE may start the uplink transmission on any resource or any sub-resource in the transmission period P; or that the UE may start the uplink transmission on any resource or any sub-resource in the transmission period P that may ensure completion of K repetitions within the transmission period P (i.e., not crossing the boundary of the transmission period). The base station may configure one of the foregoing methods to the UE by the higher layer signaling.

Timing Method for Uplink Transmission During BWP Switching

In the NR system, a timer is introduced for configuring the uplink transmission, and when the timer expires, if no uplink grant is received, the previous transmission is considered to be ACKed. However, the NR system supports the switching of the BWP that is indicated by the DCI. Since the switching needs a certain period of time, the UE does not perform any transmission and reception during this period of time. Then, when the UE performs the uplink transmission, but the base station needs a certain period of time for processing, the base station detects the uplink transmission transmitted by the UE, and the base station indicates the BWP switching to the UE due to the service requirement. According to the existing method, the UE starts the timer when starting the uplink transmission. However, if an uplink grant is transmitted to the UE for triggering the retransmission of the UE before the timer expires because the base station does not successfully receive the uplink data, it cannot be guaranteed that the UE receive the uplink grant for triggering the retransmission since the UE does not monitor the downlink PDCCH during the BWP switching, and then the UE would consider that the transmission has been successfully received by the base station.

In order to solve this problem, according to an embodiment of the present disclosure, it may be specified that the UE pauses the timer after receiving the DCI indicating the BWP switching, and restarts/continues the timer after switching to the new BWP.

Figure 24:
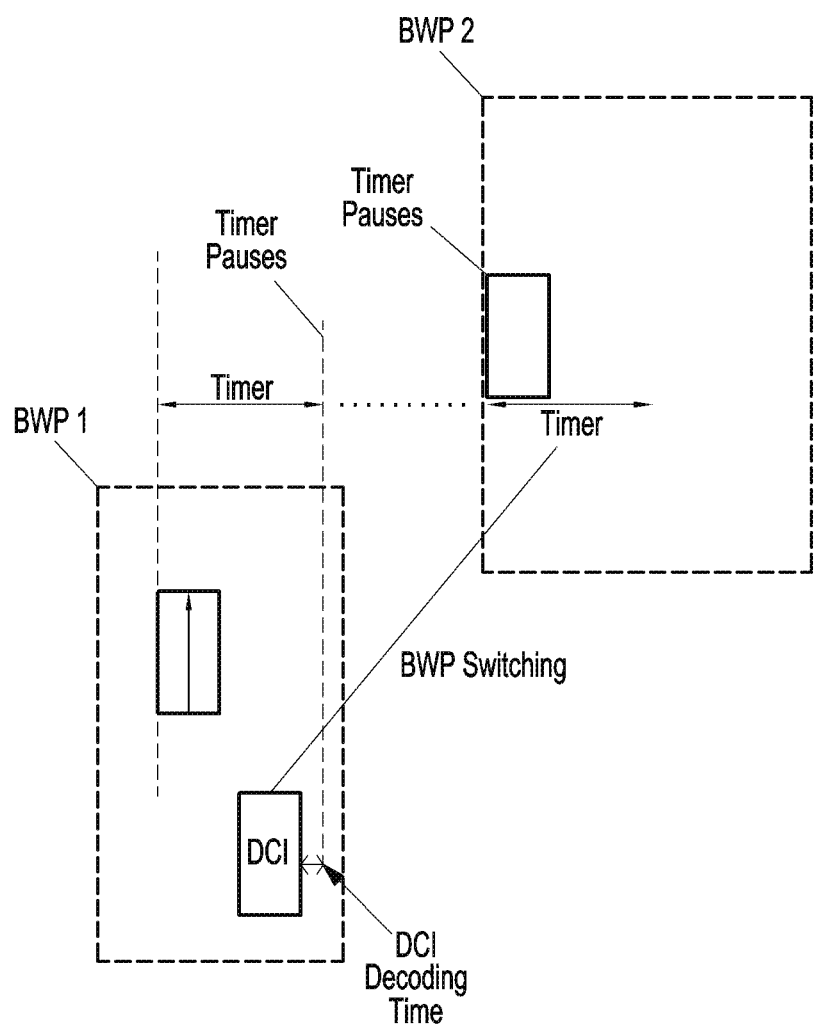
FIG. 24 illustratively shows a schematic diagram of a timing method of an uplink transmission at a BWP switching according to an embodiment of the present disclosure.
Figure 25:
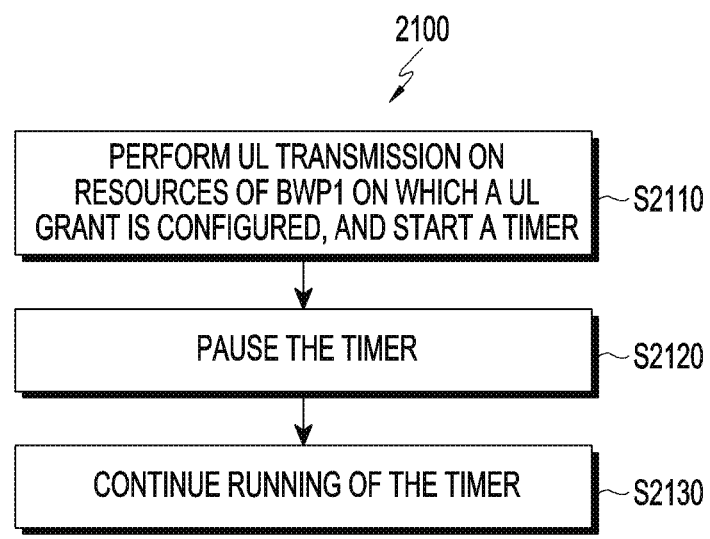
FIG. 25 illustratively shows a flowchart of a timing method of an uplink transmission at a BWP switching according to an embodiment of the present disclosure.

FIG. 24 illustratively shows a schematic diagram of a timing method of an uplink transmission at a BWP switching according to an embodiment of the present disclosure, and FIG. 25 illustratively shows a flowchart of a timing method of an uplink transmission at a BWP switching according to an embodiment of the present disclosure.

As shown in FIG. 24 and FIG. 25, in step S2110, the UE performs an uplink transmission on resources of a configured uplink grant of BWP1, and starts a timer. Subsequently, in step S2120, the UE receives a BWP switching indication, for example, successfully decoding the DCI on BWP1 which indicates switching from the BWP1 to BWP2, then the UE pauses the timer. When the UE switches to a new BWP, the UE continues the running of the timer for the uplink transmission in step S2130.

According to an embodiment of the present disclosure, continuing the running of the timer when switching to the new BWP may include: continuing the running of the timer after the minimum time required for the BWP switching (which may be based on the UE reporting capability, or predefined in the standard); or continuing the running of the timer when the UE starts transmitting or receiving data according to the uplink or downlink grant indicated by the base station; or continuing the running of the timer when starting to monitor the downlink search space in the new BWP.

After the timer continues to run, the base station may schedule a retransmission on the BWP2 for the UE by the DCI.

According to another embodiment of the present disclosure, if the UE receives the BWP switching indication after transmitting the uplink channel on the resources of the configured uplink grant of BWP1 and before the timer expires, the UE may not pause the timer but increase the time length of the timer. The increased time length may be configured by the base station, or may be based on the shortest time required for the BWP switching, or based on the UE PUSCH preparation duration, or based on PUSCH or PDSCH scheduling (such as the slot offset, or the slot offset plus the start symbol position offset), or based on the time difference to the next PDCCH search space. The PDCCH search space may be the first one of all configured search spaces, or a UE-specific search space, or a common search space.

According to another embodiment of the present disclosure, it may be specified in the protocol that if the UE receives the PDCCH for the BWP switching on the PUSCH transmitted on the resources of the configured uplink grant, the UE may ignore the PDCCH for the BWP switching; or decide to switch the BWP or ignore the PDCCH for the BWP switching; or consider the HARQ process of the PUSCH transmitted on the resources of the configured uplink grant to be NACKed (i.e., consider that the NDI of the HARQ process is not toggled).

The PUSCH transmission may or may not be counted as one HARQ transmission, it waits for the next available uplink grant retransmission, or the HARQ buffer is flushed, or the storage of all configured uplink grants are flushed.

The above method may effectively prevent the UE from erroneously determining the TB that has not been successfully received as being successfully received, thereby improving the reliability.

In NR, the base station may configure an inactivity timer of the BWP for the UE, and determine whether to increase the BWP inactivity timer according to whether the DCI for indicating PDSCH reception or PUSCH transmission is detected. When the BWP inactivity timer expires, the UE switches to the initial BWP or the default BWP. However, according to an embodiment of the present disclosure, if the UE performs the uplink transmission on the granted uplink transmission, the UE should also restart the inactivity timer of the BWP; or pause the inactivity timer of the BWP until the timer configured for the uplink transmission expires; or increase the time length of the inactivity timer of the BWP. The increased time length may be configured by the base station or may be the maximum time length of the timer configured for the uplink transmission.

Preferably, the BWP in the foregoing method may be an uplink BWP or a downlink BWP, or the foregoing method is applicable to both the uplink BWP and the downlink BWP. Furthermore, the above method is equally applicable to handover and/or activation and/or deactivation of a secondary serving cell.

According to an embodiment of the present disclosure, the UE and/or the base station may support all or a part of the foregoing methods at the same time, which may be determined according to the configuration of the base station or specified according to the protocol. It is also possible to enable at least one of the methods for the UEs with different capabilities (supporting all or a part of the above methods). The above methods are applicable to the approaches of indicating the uplink grant based on the DCI and/or RRC and/or MAC for the PUSCH and PUCCH.

Figure 26:
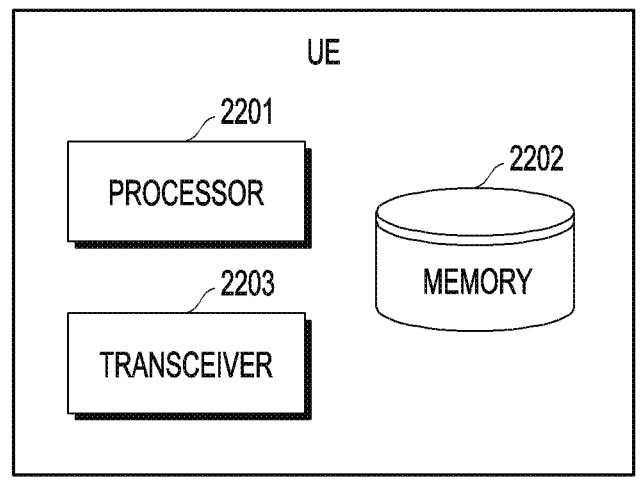
FIG. 26 illustratively shows a structure block diagram of a UE according to an exemplary embodiment of the present disclosure.

A structure of a UE according to an exemplary embodiment of the present disclosure will be described below with reference to FIG. 26. FIG. 26 illustratively shows a structure block diagram of a UE 2200 according to an exemplary embodiment of the present disclosure. The UE 2200 may be used to perform the method 300 described with reference to FIG. 3, the method 800 described with reference to FIG. 8, or the method 2100 described with reference to FIG. 25. For the sake of brevity, only the schematic structure of the UE according to an exemplary embodiment of the present disclosure will be described herein, and the details already described in the methods 300, 800, and 2100 described above with reference to FIGS. 3, 8, and 25 are omitted.

As shown in FIG. 26, the UE 2200 includes a processing unit or processor 2201, which may be a single unit or a combination of a plurality of units for performing different steps of the methods; a memory 2202, in which computer executable instructions are stored. The UE 2200 may further include a transceiver 2203 for transmitting and/or receiving data/information. The instructions, when executed by the processor 2201, cause the processor 2201 to determine a transmission occasion for an uplink transmission and a HARQ process ID corresponding to the transmission occasion; determine an antenna port according to a correspondence between antenna ports and HARQ process IDs and/or a correspondence between antenna ports and transmission occasions; and transmit, by the antenna port, uplink data corresponding to the HARQ process ID and a pilot signal corresponding to the uplink data.

According to an embodiment of the present disclosure, the instructions, when executed by the processor 2201, further causes the processor 2201 to determine the pilot signal corresponding to the uplink data according to at least one of: the HARQ process ID; the transmission occasion; or a configured parameter for generating the pilot signal.

According to an embodiment of the present disclosure, the instructions, when executed by the processor 2201, further cause the processor 2201 to perform mapping of the uplink data according to antenna port information related to data mapping.

According to an embodiment of the present disclosure, the instructions, when executed by the processor 2201, further cause the processor 2201 to map, according to information indicating an antenna port for which no data mapping is performed that is configured by a base station, the uplink data on resource elements other than resource elements corresponding to the antenna port for which no data mapping is performed; map, according to all antenna ports in the correspondence between the antenna ports and the HARQ process IDs, the uplink data on resource elements other than resource elements corresponding to all the antenna ports on the symbol where the pilot signal is located; and map, according to an HARQ process ID corresponding to other transmission occasions occupied by the transmission of the uplink data started from the transmission occasion and at least one antenna port corresponding to the HARQ process ID, the uplink data on resource elements on a symbol where the pilot signal is located other than resource elements corresponding to the at least one antenna port and the antenna port for transmitting the uplink data and the pilot signal.

According to an embodiment of the present disclosure, the instruction, when executed by the processor 2201, further causes the processor 2201 to determine a latest transmission occasion in an entire set of start positions of respective repetitions or a subset of start positions of the respective repetitions as the transmission occasion, according to time-frequency resource information and/or information of a number of repetitions in configuration information of uplink transmission configured by a base station; or determine a latest start position in start positions of each transmission period as the transmission occasion, according to transmission period information and/or the time domain offset information in configuration information of uplink transmission configured by a base station; or determine a latest sub-resource as the transmission occasion, according to initial resource information in configuration information of uplink transmission configured by a base station, where the sub-resource includes one or more symbols.

According to an embodiment of the present disclosure, the transmission period is configured to include one or more symbols, and a time length corresponding to the transmission period is less than a time length required for the number of repetitions configured for the uplink transmission.

According to an embodiment of the present disclosure, the instructions, when executed by the processor 2201, further cause the processor 2201 to receive configuration information of an uplink transmission, which includes: information indicating that a repetition of time-frequency resource information is performed in a unit of a mini-slot; and perform the transmission according to the configuration information.

According to an embodiment of the present disclosure, the configuration information further includes: information indicating that the repetition is or is not allowed to cross a slot boundary.

According to an embodiment of the present disclosure, the instructions, when executed by the processor 2201, further cause the processor 2201 to perform mapping of uplink transmissions according to at least one of: mapping on an uplink symbol and a flexible symbol, wherein the uplink transmission is mapped to a next uplink symbol or flexible symbol if a downlink symbol is reached; mapping one repetition of the uplink transmission to consecutive uplink symbols, only if a number of consecutive uplink symbols is greater than or equal to a number of symbols in the repetition; or mapping on an uplink symbol only, wherein the uplink transmission is mapped on a next uplink symbol if a downlink symbol or a flexible symbol is reached.

According to an embodiment of the present disclosure, the instructions, when executed by the processor 2201, further cause the processor 2201 to perform frequency hopping on the transmission according to at least one of approaches, in which the frequency hopping is performed in a unit of each repetition of the transmission; a predetermined number of repetitions are transmitted on a predetermined number of hops; and a predetermined number of symbols of each repetition are transmitted on a predetermined number of hops.

According to an embodiment of the present disclosure, the instructions, when executed by the processor 2201, further cause the processor 2201 to pause a timer that is running for the uplink transmission when a BWP switching indication is received; and continue the running of the timer when a new BWP is switched to.

According to an embodiment of the present disclosure, the instructions, when executed by the processor 2201, further cause the processor 2201 to continue the running of the timer after a shortest time period required for the BWP switching; continue the running of the timer when the UE starts data transmission or reception according to an uplink or downlink grant indicated by a base station; or continue the running of the timer when a downlink search space is started to be monitored in the new BWP.

Figure 27:
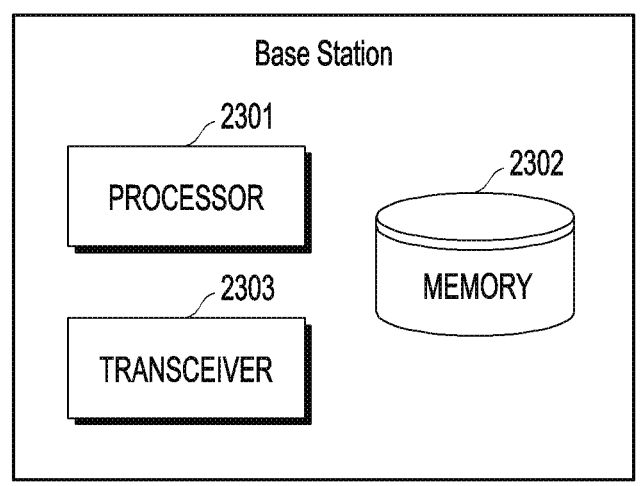
FIG. 27 illustratively shows a structure block diagram of a base station according to an exemplary embodiment of the present disclosure.

A structure of a base station according to an exemplary embodiment of the present disclosure will be described below with reference to FIG. 27. FIG. 27 illustratively shows a structure block diagram of a base station 2300 according to an exemplary embodiment of the present disclosure. The base station 2300 may be used to perform method 700 described with reference to FIG. 7. For the sake of brevity, only the schematic structure of the base station according to an exemplary embodiment of the present disclosure will be described herein, and the details already described in the method 700 described above with reference to FIG. 7 are omitted.

As shown in FIG. 27, the base station 2300 includes a processing unit or processor 2301, which may be a single unit or a combination of a plurality of units for performing different steps of the method; a memory 2302, in which computer executable instructions are stored. The base station 2300 may further include a transceiver 2303 for transmitting and/or receiving data/information. The instructions, when executed by the processor 2301, cause the processor 2301 to detect, for each transmission occasion, a pilot signal corresponding to uplink data on an antenna port corresponding to the transmission occasion; and determine the HARQ process ID of the uplink data according to a correspondence between an antenna port on which the pilot signal is detected and a HARQ process ID.

The various steps are described in a particular order in the above flowcharts. However, it will be apparent to the skilled in the art that the steps need not necessarily be performed in the order as shown, but rather, they can be performed in a reverse order, or in parallel, as long as there is no contradiction.

Computer-executable instructions or programs for implementing the functions of various embodiments of the present disclosure may be recorded on a computer-readable storage medium. Corresponding functions can be realized by having a computer system read programs recorded on the recording medium and execute these programs. The so-called "computer system" herein may be a computer system embedded in the device, and may include an operating system or hardware (such as a peripheral device). The "computer-readable storage medium" may be a semiconductor recording medium, an optical recording medium, a magnetic recording medium, a short-time dynamic storage program recording medium, or any other recording media readable by a computer.

Various features or functional modules of the devices used in the above embodiments may be implemented or performed by circuitry (e.g., a single-chip or multi-chip integrated circuit). Circuits designed to perform the functions described in the present specification may include general purpose processors, digital signal processors (DSPs), application specific integrated circuits (ASICs), field programmable gate arrays (FPGAs), or other programmable logic devices, discrete Gate or transistor logic, discrete hardware components, or any combination of the above. A general-purpose processor may be a microprocessor or any existing processor, controller, microcontroller, or state machine. The above circuit may be a digital circuit or an analog circuit. In a case of new integrated circuit technology that replaces existing integrated circuits due to advances in semiconductor technology, one or more embodiments of the present disclosure may also be implemented using these new integrated circuit technologies.

The skilled in the art will understand that the present disclosure includes devices that are involved in performing one or more of the operations described in the present disclosure. These devices may be specially designed and manufactured for the required purposes, or may also include known devices in general purpose computers. These devices have computer programs stored thereon that are selectively activated or reconfigured. Such computer programs may be stored in a device (e.g., a computer) readable medium or in any type of medium suitable for storing electronic instructions and coupled to a bus, including but not limited to any types of disks, including a floppy disk, a hard disk, an optical disk, a CD-ROM, and a magneto-optical disk, a ROM (Read-Only Memory), a RAM (Random Access Memory), an EPROM (Erasable Programmable Read-Only Memory), an EEPROM (Electrically Erasable Programmable Read-Only Memory), a flash memory, a magnetic card, or a light card. That is, a readable medium includes any medium that stores or transmits information in a readable form by a device (e.g., a computer).

The skilled in the art can understand that each block of these structural diagrams and/or block diagrams and/or flowcharts, and combinations of blocks in these structural diagrams and/or block diagrams and/or flowcharts may be implemented by computer program instructions. The skilled in the art can understand that these computer program instructions can be provided to a processor of a general-purpose computer, a professional computer, or a processor for other programmable data processing method, so that the schemes specified in one or more blocks of the structural diagrams and/or block diagrams and/or flowcharts may be executed by the processor of the computer or the computer for other programmable data processing method.

The skilled in the art can understand that various operations, methods, steps, measures, and schemes that have been discussed in the present disclosure can be alternated, changed, combined, or deleted. Further, various operations, methods that have been discussed in the present disclosure, and other steps, measures, and schemes in the process can also be alternated, changed, rearranged, decomposed, combined, or deleted. Further, various operations, methods, steps, measures, and schemes in the prior art and those disclosed in the present disclosure may also be alternated, changed, rearranged, decomposed, combined, or deleted.

The foregoing descriptions are merely some of the embodiments of the present disclosure. It should be noted that for the skilled in the art, a number of improvements and modifications may be made without departing from the principle of the present disclosure. These improvements and modifications should also fall within the protection scope of the present disclosure.

The invention claimed is:

1. A method for transmitting uplink data by a user equipment (UE) in a wireless communication system, the method comprising:
receiving, from a base station, configuration information including information on a resource allocation for physical uplink shared channel (PUSCH) transmission in a time domain, and information indicating a PUSCH repetition;
identifying, based on the configuration information, whether the UE is configured with the PUSCH repetition across a slot boundary in consecutive slots;
identifying whether an invalid symbol for the PUSCH repetition exists among symbols in a slot; and
in case that the UE is configured with the PUSCH repetition across the slot boundary in the consecutive slots, transmitting a repetition of the PUSCH transmission comprising a first part and a second part, wherein the first part of the repetition is allocated in a slot n and the second part of the repetition is allocated in slot n+1,
wherein a repetition of the PUSCH transmission is transmitted into multiple repetitions based on the invalid symbol in case that the invalid symbol exists in the slot, the invalid symbol including a downlink symbol to be dropped.

2. The method of claim 1, wherein the repeated PUSCH transmission is performed in a unit of a number of symbols less than or equal to a number of symbols constituting one slot.

3. The method of claim 1, wherein the information on the resource allocation includes information indicating a number of repetition of the PUSCH transmission, information indicating a start symbol of the PUSCH transmission, and information indicating a number of consecutive symbols from the start symbol allocated for the PUSCH transmission.

4. A user equipment (UE) in a wireless communication system, the UE comprising:
a transceiver;
a processor communicatively coupled to the transceiver; and
memory storing computer executable instructions that, when executed by the processor, cause the UE to:
receive, via the transceiver from a base station, configuration information including information on a resource allocation for physical uplink shared channel (PUSCH) transmission in a time domain, and information indicating a PUSCH repetition,
identify, based on the configuration information, whether the UE is configured with the PUSCH repetition across a slot boundary in consecutive slots,
identify whether an invalid symbol for the PUSCH repetition exists among symbols in a slot, and
in case that the UE is configured with the PUSCH repetition across the slot boundary in the consecutive slots, transmit a repetition of the PUSCH transmission comprising a first part and a second part, wherein the first part of the repetition is allocated in a slot n and the second part of the repetition is allocated in slot n+1,
wherein a repetition of the PUSCH transmission is transmitted into multiple repetitions based on the invalid symbol in case that the invalid symbol exists in the slot, the invalid symbol including a downlink symbol to be dropped.

5. The UE of claim 4, wherein the repeated PUSCH transmission is performed in a unit of a number of symbols less than or equal to a number of symbols constituting one slot.

6. The UE of claim 4, wherein the information on the resource allocation includes information indicating a number of repetition of the PUSCH transmission, information indicating a start symbol of the PUSCH transmission, and information indicating a number of consecutive symbols from the start symbol allocated for the PUSCH transmission.

7. A method for receiving uplink data by a base station in a wireless communication system, the method comprising:
   transmitting, to a user equipment (UE), configuration information including information on a resource allocation for physical uplink shared channel (PUSCH) transmission in a time domain, and information indicating a PUSCH repetition;
   identifying, based on the configuration information, whether the UE is configured with the PUSCH repetition across a slot boundary in consecutive slots;
   identifying whether an invalid symbol for the PUSCH repetition exists among symbols in a slot; and
   in case that the UE is configured with the PUSCH repetition across the slot boundary in the consecutive slots, receiving a repetition of the PUSCH transmission comprising a first part and a second part, wherein the first part of the repetition is allocated in a slot n and the second part of the repetition is allocated in slot n+1,
   wherein a repetition of the PUSCH transmission is received into multiple repetitions based on the invalid symbol in case that the invalid symbol exists in the slot, the invalid symbol including a downlink symbol to be dropped.

8. The method of claim 7, wherein the repeated PUSCH transmission is configured in a unit of a number of symbols less than or equal to a number of symbols constituting one slot.

9. The method of claim 7, wherein the information on the resource allocation includes information indicating a number of repetition of the PUSCH transmission, information indicating a start symbol of the PUSCH transmission, and information indicating a number of consecutive symbols from the start symbol allocated for the PUSCH transmission.

10. A base station in a wireless communication system, the base station comprising:
    a transceiver; and
    a processor communicatively coupled to the transceiver; and
    memory storing computer executable instructions that, when executed by the processor, cause the base station to:
        transmit, via the transceiver to a user equipment (UE), configuration information including information on a resource allocation for physical uplink shared channel (PUSCH) transmission in a time domain, and information indicating a PUSCH repetition,
        identify, based on the configuration information, whether the UE is configured with the PUSCH repetition across a slot boundary in consecutive slots,
        identify whether an invalid symbol for the PUSCH repetition exists among symbols in a slot, and
        receive, via the transceiver, a repetition of the PUSCH transmission comprising a first part and a second part, wherein the first part of the repetition is allocated in a slot n and the second part of the repetition is allocated in slot n+1,
    wherein a repetition of the PUSCH transmission is received into multiple repetitions based on the invalid symbol in case that the invalid symbol exists in the slot, the invalid symbol including a downlink symbol to be dropped.

11. The base station of claim 10, wherein the repeated PUSCH transmission is configured in a unit of a number of symbols less than or equal to a number of symbols constituting one slot.

12. The base station of claim 10, wherein the information on the resource allocation includes information indicating a number of repetition of the PUSCH transmission, information indicating a start symbol of the PUSCH transmission, and information indicating a number of consecutive symbols from the start symbol allocated for the PUSCH transmission.

* * * * *